(12) United States Patent
Doktycz et al.

(10) Patent No.: US 7,641,863 B2
(45) Date of Patent: Jan. 5, 2010

(54) NANOENGINEERED MEMBRANES FOR CONTROLLED TRANSPORT

(75) Inventors: Mitchel J. Doktycz, Oak Ridge, TN (US); Michael L. Simpson, Knoxville, TN (US); Timothy E. McKnight, Greenback, TN (US); Anatoli V. Melechko, Oak Ridge, TN (US); Douglas H. Lowndes, Knoxville, TN (US); Michael A. Guillorn, Knoxville, TN (US); Vladimir I. Merkulov, Oak Ridge, TN (US)

(73) Assignee: UT-Battelle LLC, Oak Ridge, TN (US)

( * ) Notice: Subject to any disclaimer, the term of this patent is extended or adjusted under 35 U.S.C. 154(b) by 473 days.

(21) Appl. No.: 10/383,309

(22) Filed: Mar. 6, 2003

(65) Prior Publication Data
US 2004/0173506 A1 Sep. 9, 2004

(51) Int. Cl.
*B01D 63/00* (2006.01)

(52) U.S. Cl. .................... 422/101; 977/745; 977/746; 977/747; 977/789; 977/906; 977/920; 977/962; 977/701; 977/704; 977/705; 977/706

(58) Field of Classification Search ......... 977/745–748, 977/750, 701, 704–706, 789, 906, 920; 422/101
See application file for complete search history.

(56) References Cited

U.S. PATENT DOCUMENTS

| | | | |
|---|---|---|---|
| 4,411,745 A | * | 10/1983 | Ball et al. ................... 205/352 |
| 5,045,172 A | * | 9/1991 | Guzman .................... 204/452 |
| 6,391,333 B1 | * | 5/2002 | Li et al. ..................... 424/443 |
| 6,423,583 B1 | * | 7/2002 | Avouris et al. .............. 438/132 |
| 6,528,020 B1 | * | 3/2003 | Dai et al. ..................... 422/98 |
| 6,685,810 B2 | * | 2/2004 | Noca et al. ................. 204/450 |
| 2002/0098135 A1 | * | 7/2002 | Smalley et al. ............. 422/198 |
| 2003/0143453 A1 | * | 7/2003 | Ren et al. ..................... 429/40 |
| 2003/0157325 A1 | * | 8/2003 | Anders et al. .............. 428/402 |
| 2004/0007528 A1 | * | 1/2004 | Bakajin et al. ............. 210/650 |
| 2004/0223900 A1 | * | 11/2004 | Khabashesku et al. ... 423/447.1 |

OTHER PUBLICATIONS

Fendler, "Polymerized Surfactant Vesicles; Novel Membrane Mimetic Systems", Science, 223, 888-894, 1994.

(Continued)

*Primary Examiner*—Jill Warden
*Assistant Examiner*—Paul S Hyun
(74) *Attorney, Agent, or Firm*—Quarles & Brady, LLP

(57) ABSTRACT

A nanoengineered membrane for controlling material transport (e.g., molecular transport) is disclosed. The membrane includes a substrate, a cover defining a material transport channel between the substrate and the cover, and a plurality of fibers positioned in the channel and connected to and extending away from a surface of the substrate. The fibers are aligned perpendicular to the surface of the substrate, and have a width of 100 nanometers or less. The diffusion limits for material transport are controlled by the separation of the fibers. In one embodiment, chemical derivatization of carbon fibers may be undertaken to further affect the diffusion limits or affect selective permeability or facilitated transport. For example, a coating can be applied to at least a portion of the fibers. In another embodiment, individually addressable carbon nanofibers can be integrated with the membrane to provide an electrical driving force for material transport.

51 Claims, 12 Drawing Sheets

OTHER PUBLICATIONS

Oku et al., "Preparation of giant liposomes," Biochimica et Biophysica Acta, 692, 384-388, 1982.

McConnell et al., "Supported planar membranes in studies of cell-cell recognition in the immune system", Biochimica et Biophysica Acta, 864, 95-106, 1986.

Groves et al., "Micropatterning fluid lipid bilayers on solid supports," Science, 275, 651-653, 1997.

Cremer et al., "Writing and erasing barriers to lateral mobility into fluid phospholipid bilayers," Langmuir, 15, 3893-3896, 1999.

Hammer and Discher, "Synthetic Cells—Self-Assembling Polymer Membranes and Bioadhesive Colloids", Annu. Rev. Mater. Res., 31, 387-404, 2001.

Martin, "Nanomaterials: A membrane-based synthetic approach," Science, 266, 1961-1966, 1994.

Pearson and Tonucci, "Nanochannel glass replica membranes," Science, 270, 68-70, 1995.

Park et at "Block copolymer lithography: Periodic arrays of ~ 1011 holes in 1 square centimeter," Science, 276, 1401-1404, 1997.

Desai et al., "Microfabricated immunoisolating biocapsules," Biotechnology and Bioengineering, 57 (1), 118-120, 1998.

Volkmuth and Austin, "DNA electrophoresis in microlithographic arrays," Nature, 358, 600-602, 1992.

Turner et al., "Monolithic nanofluid sieving structures for DNA manipulation," J. Vac. Sci. Technol. B, 16(6), 3835-3840, 1998.

Lewis and Ahmed, "Silicon nanopillars formed with gold colloidal particle masking," J. Vac. Sci. Technol. B., 16(6), 2938-2941, 1998.

Iijima, "Helical Microtubules of Graphitic Carbon," Nature, 354(6348) 56-58, 1991.

Cao et al., "Well-aligned boron nanowire arrays", 13(22), 1701-1704, 2001.

Zhang et al., "Synthesis of ordered single crystal silicon nanowire arrays," Adv. Mater., 13(16), 1238-1241, 2001.

Huang et al., "Room-temperature ultraviolet nanowire nanolasers," Science, 292, 1897-1899, 2001.

Merkulov et al., "Shaping carbon nanostructures by controlling the synthesis process", Appl. Phys. Lett., 79(8), 1178-1180, 2001.

Merkulov et al., "Sharpening of carbon nanocone tips during plasma-enhanced chemical vapor growth", Chem. Phys. Letts., 350(5-6), 381-385, 2001.

Merkulov et al., "Alignment mechanism of carbon nanofibers produced by plasma-enhanced chemical-vapor deposition," Appl. Phys. Lett., 79(18), 2970-2972, 2001.

Merkulov et al., "Patterned growth of individual and multiple vertically aligned carbon nanofibers," Appl. Phys. Lett., 76, 3555-3557, 2000.

Merkulov et al., "Shaping carbon nanostructures by controlling the synthesis process", Appl. Phys. Lett., 79(8), 1178-1180, 2000.

Guillom et al., Individually addressable vertically aligned carton nanofiber-based electrochemical probes, J. Appl. Phys., 91(6), 3824-3828, 2002.

Guillom et al., "Operation of a gated field emitter using an individual carbon nanofiber cathode," Appl. Phys. Lett., 79(21), 3506-3508, 2001.

Guillom et al., "Microfabricated field emission devices using carbon nanofibers as cathode elements," J. Vac. Sci. Tech. B., 19(6), 2598-2601, 2001.

Guillom et al., "Fabrication of Gated Cathode Structures Using an In-Situ Grown Vertically Aligned Carbon Nanofiber as a Field Emission Element," J. Vac. Sci. Tech. B, 19, 573, 2001.

Zhang et al., "Controlled Particle Transport Across Vertically Aligned Carbon Nanofiber Barriers," Applied Physics Letter, vol. 81, No. 1, 2002.

Ren et al., "Growth of a single freestanding multiwall carbon nanotube on each nanonickel dot," Appl. Phys. Lett. 75, 1086, 1999.

Ren et al., "Synthesis of Large Arrays of Well-Aligned Carbon Nanotubes on Glass", Science, 282, 1105-1107.1998.

Netchiporouk et al., "In vivo brain glucose measurements: differential normal pulse voltammetry with enzyme-modified carbon fiber microelectrodes", Anal. Chem., 68, 4358-4364, 1996.

Lee et al., "pH-switchable, ion-permselective gold nanotubule membrane based on chemisorbed cysteine", Anal. Chem., 73(4), 768-75, 2001.

Subramanian et al., "Comparison of Techniques for Enzyme Immobilization on Silicon Supports", Enzyme and Microbial Technology, 24, 26-34, 1999.

Fodor et al., "Light-Directed, Spatially Addressable Parallel Chemical Synthesis," Science, 251, 767-774, 1991.

McGall et al., "Light-directed synthesis of high-density oligonucleotide arrays using semiconductor photoresists," Proc. Natl. Acad. Sci. USA, 93, 13555-13560, 1996.

Hangsakul et al., "Protein patterning with a photoactivatable derivative of biotin," Bioconjugate Chem., 7, 249-254, 1996.

Santini et al., "A controlled-release microchip," Nature, 397, 335-338, 1999.

Cosnier, "Biosensors based on immobilization of biomolecules by electrogenerated polymer films", Applied Biochemistry and Biotechnology, 89, 127-138, 2000.

Bidan et al., "Electropolymerization as a versatile route for immobilizing biological species onto surfaces", Applied Biochemistry and Biotechnology, 89, 183-193, 2000.

Smela and Gadegaard, "Controlled folding of micrometer-size structures," Science, 268, 1735-1738, 2001.

McKnight et al., "Electroosmotically induced hydraulic pumping with integrated electrodes on microfluidic devices", Anal. Chem., 73(16), 4045-4049, 2000.

Gottschlich et al., "Integrated Microchip Device for the Digestion, Separation, and Postcolumn Labeling of Proteins and Peptides", J. Chromatogr., B745, 243-249, 2000.

Khandurina et al., "Integrated System for Rapid PCR-Based DNA Analysis in Microfluidic Devices", Analytical Chemistry, 72 13, 2995-3000, 2000.

Jacobson et al., "Microfluidic Devices for Electrokinetically Driven Parallel and Serial Mixing", Analytical Chemistry, 71, 20, 1999.

Morris and Morris, "Molecular Sieve Chromatography," In Separation Methods in Biochemistry, Chapter 7, 418-470, Halsted Press, New York, 1976.

Ackers and Steere, "Restricted diffusion of macromolecules through agar-gel membranes," Biochem. Biophys. Acta, 59, 137-149, 1962.

Sakai, "Determination of pore size and pore size distribution 2. Dialysis membranes," J. of Membrane Science, 96, 91-130, 1994.

Igawa et al., "Facilitated transport of carbohydrates via complexation with borate ion fixed on an anion-exchange membrane," Journal of Membrane Science, 98, 177-180, 1995.

Ouahid et al., "Sorption of glucose by an anion-exchange membrane in the borate form. Stability of the complexes and the facilitated transport of glucose," J. of Membrane Science, 114, 13-25, 1996.

Perrin et al., "Artificial enzymic membrane pump for glucose transport against its chemical gradient," J. of Membrane Science, 147, 95-107, 1998.

Smela et al., "Volume change in polypyrrole studied by atomic force microscopy," J. Phys. Chem. B, 105, 9395-9405, 1995.

Jager et al., "Microrobots for Micrometer-Size Objects in Aqueous Media: Potential Tools for Single-Cell Manipulation", Science, 288, 2335-2338, 2000.

Smela and Gadegaard, "Volume change in polypyrrole studied by atomic force microscopy," J. Phys. Chem. B, 105, 9395-9405, 2001.

Saitoh, "Preparation of poly(n-isopropylacrylamide)-modified glass surface for flow control in microfluidics", Anal. Sci., 18, 203-205, 2002.

Kanazawa, "Temperature-responsive chromatography using poly(n-isopropylacrylamide) hydrogel-modified silica", Anal. Sci., 18, 45-48, 2002.

Kyriakides et al., "pH-Sensitive polymers that enhance intracellular drug delivery in-vivo", J. Control Release, 78(1-3), 295-303, 2002.

Aoyaji et al., "Novel bifunctional polymer with reactivity and temperature sensitivity", J. Biomater. Sci. Polym. Ed., 11(1),101-110, 2000.

Nishizawa et al., "Metal nanotubule membranes with electrochemically switchable ion-transport selectivity," Science, 268, 700-702, 1995.

Hicks et al., "Modification of an automated liquid handling system for reagent-jet, nanoliter-level dispensing", Biotechniques, 30 (4), 878-885, 2001.

Hiratsuka et al., "Pattern formation in reaction-diffusion enzyme transistor circuits", IEICE Trans. on Fundamentals of Elec. Comm. and Computer Sciences, E82(9), 1809-1817, 1999.

Hiratsuka et al., "Enzyme transistor circuits for reaction-diffusion computing.", IEEE Trans. On cir. and Sys.—I: Fund. Theory and Appl., 46(2), 294-303, 1999.

Simpson et al., "Whole-cell biocomputing: engineering the information processing functionality of cells," Trends in Biotechnology, 19(8), 317-323, 2001.

Weiss and Knight, "Engineered communications for microbial robotics." Proceedings of DNA 6: Sixth International Meeting on DNA Based Computers, 2000.

Weiss, Homsy, and Knight "Toward in vivo digital circuits.", Proceedings of the Dimacs Workshop on Evolution as Computation, 1999.

Gardner, Cantor and Collins, "Construction of a genetic toggle switch in *Escherichia coli*", Nature, 403(6767), 339-342, 2000.

Elowitz and Leibler, "A synthetic oscillatory network of transcriptional regulators", Nature, 403 (6767), 335-338, 2000.

Hervagault et al., "Multiple steady states and oscillatory behavior of a compartmentalized phosphofructokinase system", Proc. Natl. Acad. Sci. USA, 80, 5455-5459, 1983.

Hiratsuka et al., "Pattern formation in reaction-diffusion enzyme transistor circuits", IEICE Transactions on Fundamentals of Electronics Communications and Computer Sciences, E82(9), 1809-1817, 1999.

Merkulov et al., "Shaping carbon nanostructures by controlling the synthesis process", Appl. Phys. Lett., 79(8), 1178-1180, 200.

* cited by examiner

FIGURE 5A
FIGURE 5B
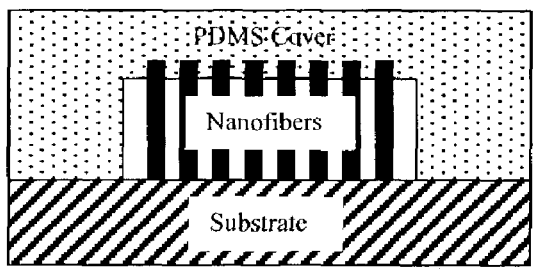
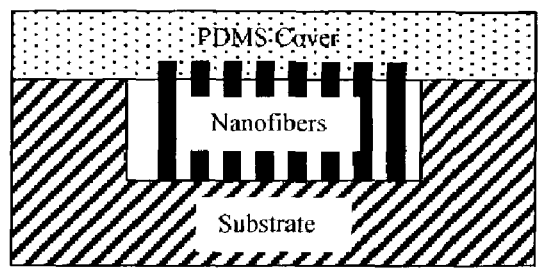
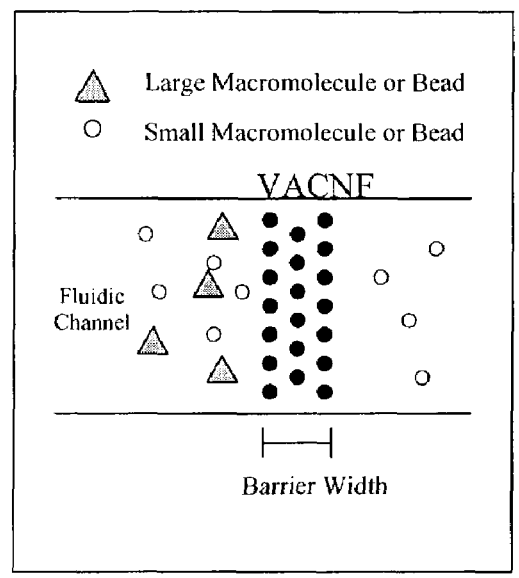
FIGURE 5C

 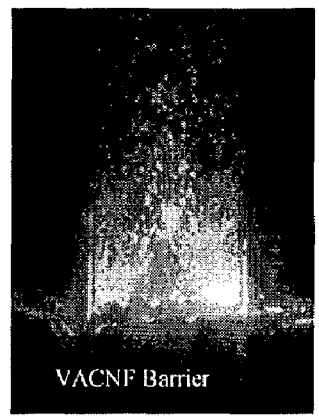 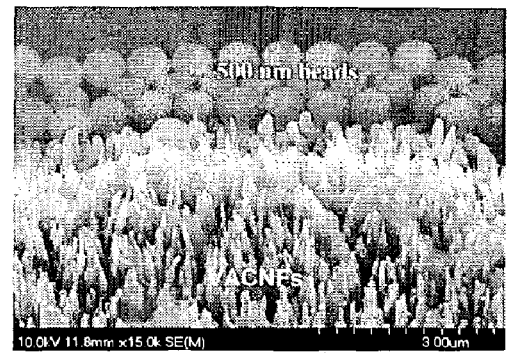
Figure 6                              Figure 7

NANOENGINEERED MEMBRANES FOR CONTROLLED TRANSPORT

STATEMENT REGARDING FEDERALLY SPONSORED RESEARCH

This invention was made with Government support under Contract No. DE-AC05-00OR22725 awarded to UT-Battelle, LLC, by the U.S. Department of Energy. The Government has certain rights in this invention.

CROSS-REFERENCES TO RELATED APPLICATIONS

Not Applicable.

BACKGROUND OF THE INVENTION

1. Field of the Invention

The invention relates to the use of nanofibers as membranes for controlling molecular transport. These devices provide nanoscale control of molecular transport by mimicking biological cellular membranes. Semi-permeable membranes can be created from the directed self-assembly of nanofibers, allowing for the passage of molecules smaller than the wall-to-wall spacing of the nanofibers. The diffusion limits can be controlled by the separation of the fibers, both laterally and along the direction of transport. Chemical potential gradients can be engineered and used to direct transport. These membranes can involve chemical derivatization of the fibers to further affect the diffusion limits or affect selective permeability or facilitated transport. Additionally, individually addressable nanofiber electrodes can be integrated with the membrane to provide an electrical driving force for transport and an electronic interface to the fluid for control and detection.

2. Description of the Related Art

Much of current nanotechnology is deriving its inspiration from natural systems. The approach of integrating nanoscale functionalities (i.e., sensing, signal processing and actuation) can be considered within the context of a biological cell. A cell interacts with its environment by "sensing" chemical signatures. This chemical information is processed by affecting the chemical networks within the cell that may result in some sort of actuation, such as production of another chemical. Biological cells are typically a few microns in diameter (bacterial cells) with membranes on the order of a few nanometers thick—dimensions that are within the range of typical nanomaterials and micromachining techniques. These dimensional characteristics of cells are fairly well conserved and are undoubtedly critical for cell function. For example, short distances (nm-µm) enable intra- and inter-cellular communication by a simple transport mechanism such as diffusion. Even large proteins can diffuse across distances of a few microns in only a few tenths of a second. Also, the small fluid volume of a cell allows for only a few thousand molecules to result in a significant concentration difference. Reducing the scale of artificial systems to these dimensions will be critical for their effective implementation as well as for interfacing to biological systems. To mimic the properties of biological cells, details at the nanometer scale must be combined with structures that are microns or millimeters in extent. Therefore, a significant challenge and opportunity exists in the construction of components with engineered features on multiple length scales that scale six orders of magnitude (nm. to mm.).

Cells possess many features that are worthy of emulation. Amazingly, cell function can be extremely diverse yet utilize a common set of building blocks. Cells can operate under a wide range of environmental conditions with efficiencies unmatched by artificial creations. Further, cells can be highly specialized, carry out tens of thousands of chemical reactions in parallel, and communicate with other cells.

Artificial creations can have greatly increased functionality with the synthesis of even simple cell-like structures. The use of a cellular structure is a universal feature throughout nature. The variations and functions of naturally occurring cells indicate that applications of cellular mimics may be limitless. However, just as creating structures on the scale of natural systems presents great opportunities, it also presents significant challenges. The most significant challenge in mimicking cell structures is fabricating appropriate membrane structures that contain molecular-scale pores. A fluid, lipid bilayer membrane envelopes natural cells. It serves as both a container and a controller of the chemical reactions inside the cell. Reagents are exchanged with the neighboring environment through the creation of chemical potential gradients, or actively transported using enzymatic systems. This sort of molecular transport is distinct from bulk fluidic-based transport. Membrane transport is molecule specific and is accomplished either passively, based on chemical potential gradients, or actively using energy transduction schemes. For mimicking cellular structures, the incorporation of semi-permeable barriers, or membranes, is a necessity. These membranes must be able to selectively control the transport of molecular species, requiring engineering on the nanometer scale.

There are many material approaches to mimicking membranes (Fendler, "Polymerized Surfactant Vesicles; Novel Membrane Mimetic Systems", *Science,* 223, 888-894, 1994). One approach to the construction of synthetic membranes involves the classical techniques of forming lipid vesicles. Mechanical agitation, or sonication, of phospholipids forms discrete vesicles, or liposomes. Such liposomes are typically small, however other techniques can produce liposomes with diameters on the order of 100 microns (Oku et al., "Preparation of giant liposomes," *Biochimica et Biophysica Acta,* 692, 384-388, 1982). Planar supported bilayers can also be constructed from phospholipids (McConnell et al., "Supported planar membranes in studies of cell-cell recognition in the immune system", *Biochimica et Biophysica Acta,* 864, 95-106, 1986). Micropatterning of these planar supported bilayers has been accomplished using lithographically patterned grids (Groves et al., "Micropatterning fluid lipid bilayers on solid supports," *Science,* 275, 651-653, 1997; and Cremer et al., "Writing and erasing barriers to lateral mobility into fluid phospholipid bilayers," *Langmuir,* 15, 3893-3896, 1999). This method can confine membrane components to specific grid elements but does not result in fluid filled cells of practical utility as the planar supported membranes rest on only a 10-20 Å thick aqueous layer. These artificial membranes, composed of naturally occurring membrane components, have been useful in understanding the physical and biological properties of cell membranes (e.g. permeability, molecular events in signal transduction). The use of liposomes, or polymeric vesicles, has also been considered for the creation of synthetic cells such as those suitable for targeted drug delivery (Fendler, "Polymerized Surfactant Vesicles; Novel Membrane Mimetic Systems", *Science,* 223, 888-894, 1994; and Hammer and Discher, "Synthetic Cells—Self-Assembling Polymer Membranes and Bioadhesive Colloids", *Annu. Rev. Mater. Res.,* 31, 387-404, 2001). The construction of vesicles with integrated functionalities may be possible with such systems. However, the design of discrete, joined cells with specific pore structures is not obvious with this approach. The seemingly beneficial structure that is both fluid and self-assembling also allows for free diffusion and reshaping of the membrane. Additionally, the long-term stability of such structures may preclude their use in practical applications.

Other membrane structures have been constructed from rigid polymeric films or metals containing nanopores (Martin, "Nanomaterials: A membrane-based synthetic approach," Science, 266, 1961-1966, 1994). Polyester, polycarbonate, or aluminum can be etched to create pore diameters as small as a few nanometers. Extremely small pores can also be created in glass by the repeated drawing and bundling of glass capillaries containing an etchable core. Tonucci and co-workers have prepared nanochannel glass templates useful for creating porous membranes of various metals (Pearson and Tonucci, "Nanochannel glass replica membranes," Science, 270, 68-70, 1995). The pore diameters of these structures can be as small as a few tens of nanometers. Silicon substrates can also be used as nanoporous substrates. For example, block copolymer lithography has been used to prepare pores on the order of 20 nanometers at a pitch of 40 nanometers in silicon nitride-coated silicon wafers (Park et al., "Block copolymer lithography: Periodic arrays of ~$10^{11}$ holes in 1 square centimeter," Science, 276, 1401-1404, 1997). Nanopores have also been created in silicon by selective etching of carefully engineered oxide layers. Pores as small as 18 nanometers have been prepared for the construction of a silicon "biocapsule" useful for immunoisolation (Desai et al., "Microfabricated immunoisolating biocapsules," Biotechnology and Bioengineering, 57 (1), 118-120, 1998). However, as with the lipid bilayers discussed above, these structures are planar in format and do not lend themselves to the design of discrete, fluidly joined cells. Additionally, membranes based on these materials are typically thick (~100 μm) relative to biological membranes. This can considerably limit the rate at which material can transfer across a membrane potentially limiting chemical transfer rates compared to natural cell membranes.

An alternate approach to creating sieving structures is to create obstacles that are perpendicular to the direction of transport. For example, micromachined posts have been used as synthetic gel media in the electrophoretic separation of biomolecules (Volkmuth and Austin, "DNA electrophoresis in microlithographic arrays," Nature, 358, 600-602, 1992). These posts have been constructed, using electron beam lithography, with features as small as 100 nm and with a monolithic fluid enclosure (Turner et al., "Monolithic nanofluid sieving structures for DNA manipulation," J. Vac. Sci. Technol. B, 16(6), 3835-3840, 1998). In this approach to molecular sieving, the distance between the outer edges of the obstacles creates the "pore". The planned construction of these structures enables explicit definition of the separation capabilities, promising to be a superior alternative to the randomly arranged pores of polymer gels. In general, the limitations of conventional micromachining techniques prevent constructing such structures with molecular dimensions. Silicon etching techniques have been extended to the construction of nanopillars, however the aspect ratio of such pillars places great restriction on the height (Lewis and Ahmed, "Silicon nanopillars formed with gold colloidal particle masking," J. Vac. Sci. Technol. B., 16(6), 2938-2941, 1998).

The arrangement of carbon nanotubes (Iijima, "Helical Microtubules of Graphitic Carbon," Nature, 354(6348) 56-58, 1991) may provide an alternative approach to creating membrane structures. However, the self-assembly of these products into higher order structures will require improved technical advances. Template-based methods have been described that allow the ordering of nanoscale objects (Martin, "Nanomaterials: A membrane-based synthetic approach," Science, 266, 1961-1966, 1994). For example, arrays of nanowires and nanorods have been described (Cao et al., "Well-aligned boron nanowire arrays", 13(22), 1701-1704, 2001; Zhang et al., "Synthesis of ordered single crystal silicon nanowire arrays," Adv. Mater., 13(16), 1238-1241, 2001; and Huang et al., "Room-temperature ultraviolet nanowire nanolasers," Science, 292, 1897-1899, 2001). However, these techniques only allow for a limited control of nanowire position and morphology on a larger scale.

It has been recently demonstrated by the inventors of the present application that catalytically controlled growth provides a powerful method for directed self-assembly of vertically aligned carbon nanofibers into microscale and larger structures. (See Merkulov et al., "Shaping carbon nanostructures by controlling the synthesis process", Appl. Phys. Lett., 79(8), 1178-1180, 2001; Merkulov et al., "Sharpening of carbon nanocone tips during plasma-enhanced chemical vapor growth", Chem. Phys. Letts., 350(5-6), 381-385, 2001; Merkulov et al., "Alignment mechanism of carbon nanofibers produced by plasma-enhanced chemical-vapor deposition," Appl. Phys. Lett., 79(18), 2970-2972, 2001; Merkulov et al., "Patterned growth of individual and multiple vertically aligned carbon nanofibers," Appl. Phys. Lett., 76, 3555-3557, 2000; Merkulov et al., "Shaping carbon nanostructures by controlling the synthesis process", Appl. Phys. Left., 79(8), 1178-1180, 2000; Guillorn et al., "Individually addressable vertically aligned carbon nanofiber-based electrochemical probes, J. Appl. Phys., 91(6), 3824-3828, 2002; Guillorn et al., "Operation of a gated field emitter using an individual carbon nanofiber cathode," Appl. Phys. Lett., 79(21), 3506-3508, 2001; Guillorn et al., "Microfabricated field emission devices using carbon nanofibers as cathode elements," J. Vac. Sci. Tech. B., 19(6), 2598-2601, 2001; and Guillorn et al., "Fabrication of Gated Cathode Structures Using an In-Situ Grown Vertically Aligned Carbon Nanofiber as a Field Emission Element," J. Vac. Sci. Tech. B, 19, 573, 2001.) This "bottom-up" approach to construction allows control over the physical features of vertically aligned carbon nanofibers, and in combination with some "top-down" fabrication techniques (e.g. e-beam lithography) provides a powerful tool for the realization of complex microscale devices with functional nanoscale features. The ability to create fibers perpendicular to the substrate surface, with dimensions on the nanometer scale, provides the controlled synthesis and directed assembly required to realize membrane structures capable of controlling molecular transport. (See Zhang et al., "Controlled Particle Transport Across Vertically Aligned Carbon Nanofiber Barriers," Applied Physics Letter, vol. 81, No. 1, 2002.)

SUMMARY OF THE INVENTION

A membrane according to the invention can be used for controlling material transport. The membrane includes a substrate and a cover. The substrate and the cover at least partially define a channel between the substrate and the cover. The membrane also includes a plurality of fibers connected to and extending away from a surface of the substrate. The fibers are positioned in the channel and are aligned within 45 degrees of perpendicular to the surface of the substrate. The fibers have a width of 100 nanometers or less, and at least a portion of the fibers have a coating. In one example form, the fibers are carbon fibers. However, the fibers may be formed from silicon, metal, or plastic.

The diffusion limits for material transport are controlled by the separation of the fibers, both laterally and along the direction of material transport in the channel of the membrane. To achieve this, recent advances in nanofabrication can allow for synthesis of physical features on length scales ranging from nanometers to centimeters. These fabrication techniques allow for the construction of cellular mimetics that incorporate features of semi-permeable membranes, chemical sensing and actuation in a footprint of less than 100 µm. The nanostructured features are derived from the synthesis of carbon nanofibers and allow for control on the molecular scale.

In one aspect of the invention, chemical derivatization of the fibers of the membrane is undertaken to further affect the diffusion limits or affect selective permeability or facilitated transport. For example, one or more coatings can be applied to at least a portion of the fibers to further affect the diffusion limits, selective permeability, or facilitated transport. Chemical potential gradients can also be engineered and used to direct transport.

In another aspect of the invention, individually addressable carbon nanofiber electrodes can be integrated with the membrane to provide an electrical driving force for material transport and an electronic interface to the fluid for control and detection. In one form of the membrane, at least two of the fibers are bonded to separate conductive leads, and the separate conductive leads are in electrical communication with a source of electricity and are used to create an electrical gradient between fibers.

Mimicking the function of natural cellular membranes presents both a significant challenge and a significant opportunity to modern analytical technology. Synthetic microcells with dimensions similar to common biological cells would offer many benefits. Similar to biological cells, these structures could allow for chemical reactions to be localized allowing detailed organization. Microscale chemical "factories" could be constructed enabling sample-to-answer biological fluid assays, allowing real-time, unobtrusive monitoring and control of a person's health parameters. These biomimetic systems could combine features such as chemical sensing, chemical logic and chemical signaling, again analogous to biological systems. Compartmentalized structures, segregated by semi-permeable membranes constructed as described here, would allow for localization and communication between reaction centers. Discrete compartmentalized structures with defined connectivity would permit specialized "cells" to reside in close proximity, consequently allowing for multifunctional activity to occur in a mesoscale object.

Some of the prime limitations to building cellular mimics are the construction and filling of cells separated by semi-permeable membranes. Cell sizes of a few microns correlate to fluid volumes on the order of femtoliters. Advances in micromachining technology are allowing for the routine construction of micron scale devices. Similarly, advances in fluid handling are beginning to enable the manipulation of small volumes of fluid. For example, ink jet technology allows for the deposition of chemical reagents with footprints of a few microns, while chemical stamping, or writing technology, is able to print on even smaller scales. Though challenging, the construction of arrayed fluid filled cells, with dimensions similar to natural cells, is technically achievable. However, for these cells to function analogously to biological cells, the incorporation of semi-permeable barriers, or membranes, is a necessity. These membranes must be able to control selectively the transport of molecular species, requiring engineering on the nanometer scale. This capability is becoming possible through advances in nanoscale science, engineering, and technology. The invention described here directly addresses these limitations to constructing cellular mimics. This invention will enable the engineered construction of joined cellular structures capable of chemical communication. Further, the incorporation of artificial, electronic-based control mechanisms is readily incorporated. A hybrid electronic/chemical system may allow for a unique control of chemical reactions. Potentially, complex chemical reaction systems could be used to power electronic circuits or electronic logic system could control and power chemical systems. By "complex chemical reaction system", we mean a reaction that involves feedback control. The nanoscale features of the artificial membranes may enable devices with a direct interface to biological systems. Such a device could allow for an unprecedented view of biological systems, perhaps leading to metabolic control.

BRIEF DESCRIPTION OF THE DRAWINGS

These and other features, aspects, and advantages of the present invention will become better understood upon consideration of the following detailed description, appended claims, and drawings where:

FIG. 5A is a cross-sectional diagram of a fluidic structure viewed along the axis of flow. In the diagram, the channel structure is created in cover material and sealed against the substrate surface. The channel widths can be easily varied, and typical dimensions are on the order of 100 µm across and 1-8 µm deep.

FIG. 5B is a cross-sectional diagram of another fluidic structure viewed along the axis of flow. In the diagram, carbon nanofibers are grown within a fluidic channel. Such a channel can be initially prepared by conventional masking and etching followed by growth of the nanofibers. The channel widths can be easily varied, and typical dimensions are on the order of 100 µm across and 1-8 µm deep.

FIG. 5C is a top view of a membrane structure, based on a nanofiber barrier, as contained in a fluidic channel as in FIG. 5B above. The stripe of vertically aligned carbon nanofibers is placed perpendicular to the direction of flow.

FIG. 6 shows fluorescent micrographs of fluorescently labeled 500 nanometer diameter latex beads migrating down a 2×100 µm polydimethylsiloxane (PDMS) channel. The image on the right is a close-up showing the build up of beads at the fiber barrier.

FIG. 7 shows an electron micrograph of channel/fiber structure after latex beads have migrated down a 2×100 µm PDMS channel as in FIG. 6.

DETAILED DESCRIPTION OF THE INVENTION

Figure 1:
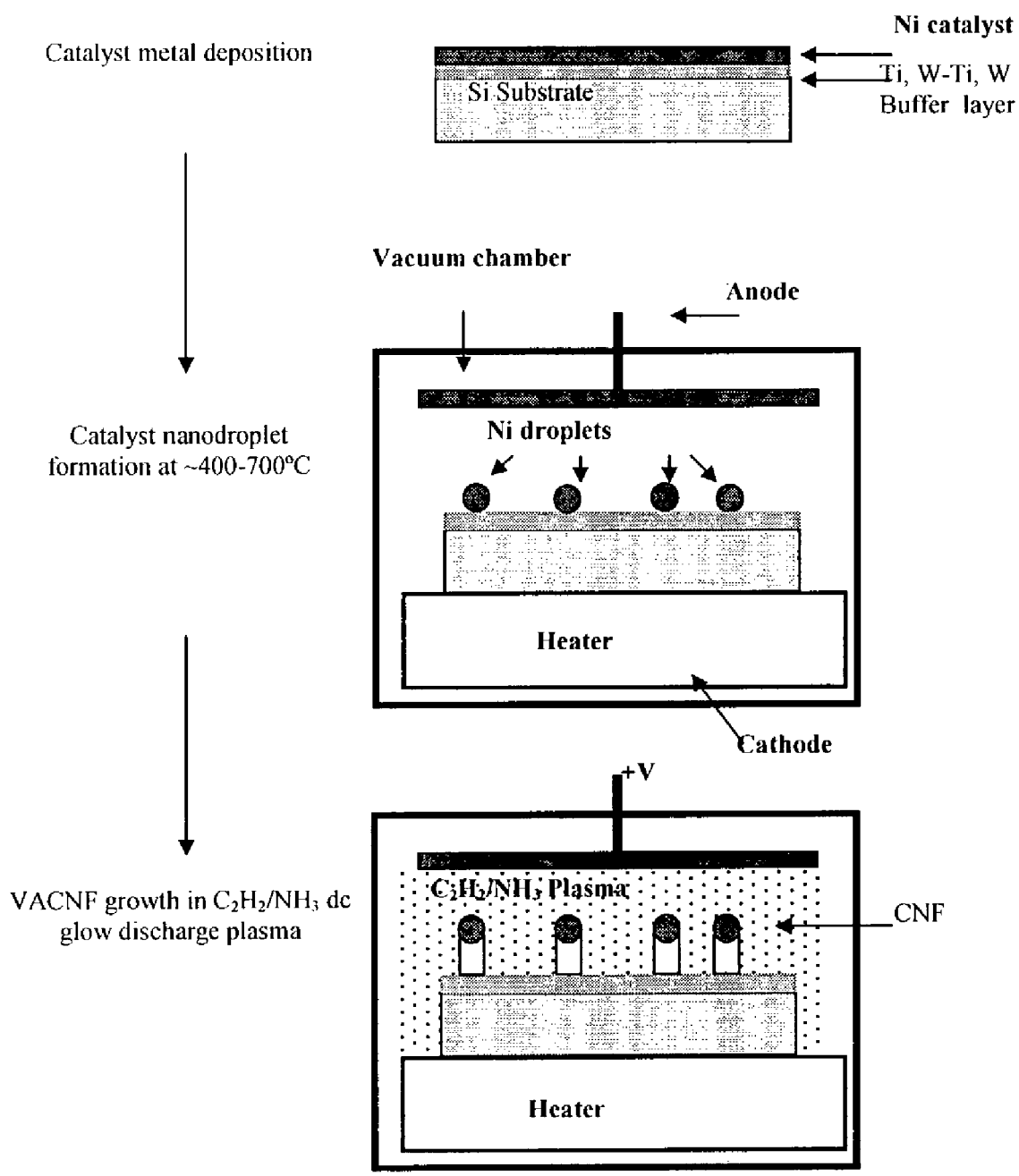
FIG. 1 shows an outline for the synthesis of vertically aligned carbon nanofibers.

A nanoengineered membrane for controlling material transport (e.g., molecular transport) according to the invention includes a substrate and a cover. The substrate and the cover at least partially define a channel between the substrate and the cover. The membrane also includes a plurality of fibers connected to and extending away from a surface of the substrate. The fibers are positioned in the channel and are aligned within 45 degrees of perpendicular to the surface of the substrate. The fibers have a width of 100 nanometers or less. The diffusion limits for material transport are controlled by the separation of the fibers. In one embodiment, the fibers are carbon and chemical derivatization of the fibers may be undertaken to further affect the diffusion limits or effect selective permeability or facilitated transport. For example, a coating can be applied to at least a portion of the fibers. In another embodiment, individually addressable carbon nanofibers can be integrated with the membrane to provide an electrical driving force for material transport.

The carbon nanofibers are connected to and extend away from a surface of the substrate, and the fibers are positioned in the channel. The fibers have a width of 100 nanometers or less. The fibers are aligned within 45 degrees of perpendicular to the surface of the substrate. For example, when the substrate is positioned in a horizontal plane, the fibers are vertically aligned at an angle of 45 degrees or greater from the horizontal plane. Preferably, the fibers in this example embodiment are aligned perpendicular to the horizontal plane. In an example embodiment, the fibers are generally cylindrical and have a diameter of 100 nanometers or less. Preferably, at least a portion of the fibers have tip diameters in the range of 1 to 100 nanometers, and at least a portion of the fibers have a length greater than 10 nanometers. In one form, at least a portion of the fibers have an interfiber spacing of 1-500 nanometers, and in another form at least a portion of the fibers have a center-to-center spacing of below 50 nanometers.

Vertically aligned (i.e. perpendicular to the substrate surface), multi-walled carbon nanofibers can be constructed by a catalytically controlled growth process. The process utilizes plasma-enhanced chemical vapor deposition (PE-CVD) and defined positioning of metal catalysts for growth of the carbon nanofiber. A mixture of acetylene ($C_2H_2$) and ammonia ($NH_3$) is used as a source gas during the PE-CVD process. The substrate is heated above ~600° C. After the plasma is turned on, carbon nanofibers grow selectively at the locations where the catalyst dots (Ni, Fe, or Co) were patterned. The catalyst dots can be positioned with nanometer scale precision using E-beam lithography. With this approach, the vertically aligned carbon nanofibers can be prepared in a completely deterministic fashion, the patterning of the particles determines the carbon nanofiber location, the size of the catalyst particle defines the diameter of the carbon nanofiber, and growth time determines the length of the carbon nanofiber.

Alternatively, stripes of catalyst can be deposited. This latter technique has the disadvantage of random placement of fibers, a chaotic forest, on the metal film, but it has the advantage of requiring only one photolithography step for metal patterning resulting in a faster and less expensive approach compared to E-beam lithography. These chaotic forests of vertically aligned carbon nanofibers can be grown in photolithographically defined areas to construct transport barriers. Further, the average vertically aligned carbon nanofiber spacing in the chaotic forests grown from the catalyst stripes can be controlled by choosing the appropriate thickness and type of the catalyst and also by adjusting the growth parameters. Consequently, this catalytically controlled carbon nanofiber-growth technique is a powerful self-assembly method that allows for the precise placement and then directed growth of a functional element with a nanoscale diameter and a length that can reach several microns.

The vertically aligned carbon nanofibers can be prepared on substrates that can withstand the growth conditions such as glass or silicon substrates or certain polymers, and can be integrated with fluidic structures, electrode structures or possibly other devices. They can also be prepared in fluidic structures, such as a microscale channel. Precisely or chaotically positioned carbon nanofibers can be grown from a catalyst stripe in desired positions, perpendicular to the flow of the fluid through the channel. For the chaotically positioned vertically aligned carbon nanofibers, the barrier width can be varied from that of a single line of nanofibers to chaotic forests several microns in extent. For the deterministically positioned vertically aligned carbon nanofibers, various diameters and spacings can be used.

Simple fluidic structures for containing the nanofiber barriers would be simple channels containing a stripe of vertically aligned carbon nanofibers perpendicular to the direction of flow which is generally parallel to the substrate. The fibers can be grown either within a channel structure or on a flat surface depending on the best procedure for securing a cover. Fluid reservoirs are placed at the ends of the channel.

FIGS. 5A-5C diagram two different approaches for designing and sealing the channel. The diagrams are cross-sections viewed along the axis of flow. In the diagram of FIG. 5B, the carbon nanofibers are grown within a fluidic channel in the substrate. Such a channel can be initially prepared by conventional masking and etching followed by growth of the nanofibers. In FIG. 5A, the channel structure is created in the cover material and sealed against the substrate surface. The channel widths can be easily varied, typical dimensions are on the order of 100 μm across and 1-8 μm deep. Alternatively, the channel structure is created by a combination of channels in the cover material and the substrate surface. In yet another alternative, part of the channel structure is formed by an intermediate layer of material between the cover material and the substrate. Thus, the channel walls may be formed from one or more of the intermediate material, the cover material and the substrate.

A simple membrane structure, based on a nanofiber barrier, can be contained in a fluidic channel as described above. The stripe of vertically aligned carbon nanofibers would be placed perpendicular to the direction of flow. FIG. 5C diagrams the use of a fiber barrier in a fluidic channel (viewed from the top). In operation, the fiber spacing and chemical characteristics would dictate the transport of molecular species. Molecules, or objects, greater the interfiber spacing would not be restricted from passing through the barrier. Additionally, chemical or electrical treatment of the barrier can further dictate transport as described below.

In one embodiment of the invention, chemical derivatization of the fibers is undertaken to further affect the diffusion limits or affect selective permeability or facilitated transport. For example, a coating can be applied to at least a portion of the fibers. The coating is selected to further control material transport through the channel. The coating may take various forms.

In one aspect of the invention, the coating used to further control material transport comprises a coating selected from oxides (such as $SiO_2$), metals (such as gold) and polymeric materials. The coating is used to control the dimensions of the fibers or to affect a physical and/or chemical and/or electrical property of a fiber. For example, the coating can be used to change the chemical attachment characteristics of the fibers. Regions of different coatings (e.g., stripes of different coatings) are also possible such that physical and/or chemical and/or electrical properties vary along the length of a fiber. In other words, a coated portion of a carbon nanofiber will have different chemical and/or physical and/or electrical property than the native (uncoated) or alternatively coated portions. For instance, an electrochemically active region may result on the uncoated carbon portion of the fibers. The electrochemical activity is limited to the exposed carbon region of each fiber. These native carbon electrode surfaces feature wide electrochemical potential windows (1V to –1.3V vs. standard calomel electrode in 150 mM KCl) and low background currents (pA). The dramatically reduced surface area of the nanofibers can provide for very high frequency electrochemical analyses, due to the reduced capacitance, and reduced background currents, of the nanoscale fiber system.

In another aspect of the invention, the coating used to further control material transport is adsorbed on the fibers. Physiadsorption may be used to couple biomolecules (such as proteins) to the carbon nanofibers. In one example form, the coating comprises a biomolecule (e.g., protein) immobilized on the fibers.

In yet another aspect of the invention, the coating used to further control material transport is covalently linked to the surface of the fibers. Covalent linking may be achieved by various methods. In one example, covalent linking to the carbon nanofibers can be accomplished through carboxylated defects on the fiber surfaces. These free carboxyl groups are available for chemical derivatization by activation with a coupling agent (such as a carbodiimide) and subsequent reaction with a primary amine ($R-NH_2$). Preferably, the coupling agent is a carbodiimide and the primary amine is an amine-containing protein.

In still another aspect of the invention, the coating used to further control material transport comprises an electro-generated polymeric coating. Non-limiting examples of the electro-generated polymeric coating include conducting polymers selected from the group consisting of polypyrroles, polyanilines, polyacetylenes, polyindoles and polythiophenes. Suitable monomers are applied to the carbon fibers and the application of electricity to the fibers initiates the polymerization process. Optionally, the thickness of the electro-generated polymeric coating is different on at least two fibers having the electro-generated polymeric coating. By altering the thickness of the coating, interfiber spacing, and therefore material transport properties, can be varied. A biomolecule may also be entrapped in or covalently coupled to the electro-generated polymeric coating.

Material transport in the membrane may also be controlled by coating the fibers with a material that changes volume upon application of an electrical potential. For example, the coating on the fibers may increase in volume upon application of an electrical potential to the carbon nanofibers. This results in a decrease in interfiber spacing and therefore, control over transport of a wider size range of material. In an example form, the material that changes volume upon application of an electrical potential comprises an electro-generated polymeric coating having incorporated anions. In another example form, multiple coatings of materials with different volume change characteristics are used.

Material transport in the membrane may also be controlled by coating the fibers with a material that changes volume upon sensing a change in pH. For example, the coating on the fibers may increase in volume upon a pH change. This results in a decrease in interfiber spacing and therefore, control over transport of a wider size range of material. In an example form, the material that changes volume upon pH change comprises an acrylic polymer such n-alkyl acrylamides and acrylimide/poly(propylacrylic) acid copolymers. In another example form, multiple coatings of materials with different volume change characteristics are used.

Any of the above coating techniques may applied to different portions of the carbon nanofibers in the membrane. For example, the membrane may include a first region of fibers having fibers with a first coating, a second region of fibers having fibers with a second coating, and a third uncoated region of fibers separating the first region of fibers and the second region of fibers. In one example embodiment, the first coating is glucokinase and the second coating is phosphatase. This membrane may be used to facilitate the transfer of glucose against a concentration gradient.

In another example membrane with multiple coatings, the plurality of carbon nanofibers are separated into a first region of fibers and a second region of fibers which are electrically connected. The first region of fibers has fibers with a first coating suitable for generating an electrical potential upon detection of an analyte (e.g., an oxidase for electrochemically sensing glucose), and the second region of fibers has fibers with a second coating that changes volume upon application of the electrical potential from the sensing of the analyte by the first coating (e.g., an electro-generated polymeric coating having incorporated anions). This form of the membrane may be constructed such that the second region of fibers is formed in a structure that contains a chemical and the change in volume of the second coating from the sensing of the analyte by the first coating releases the chemical from the structure. In one example, the analyte is glucose and the chemical is a glucose metabolizing enzyme, and in another example, the analyte is glucose and the chemical is insulin or an appropriate pharmaceutical. As a result, the membrane may integrate material transport control functions, chemical sensing, and chemical release (i.e., actuation).

In yet another example membrane with multiple coatings, the plurality of carbon nanofibers includes a first group of fibers and a second group of fibers. The first group of fibers and the second group of fibers are formed in a structure that contains a chemical, and the first group of fibers and the second group of fibers are electrically connected. The first group of fibers has a first coating suitable for generating an electrical potential upon detection of an analyte (e.g., an oxidase for electrochemically sensing glucose), and the second group of fibers has a second coating that changes volume upon application of the electrical potential (e.g., an electro-generated polymeric coating having incorporated anions). The change in volume of the second coating from the sensing of the analyte by the first coating releases the chemical from the structure. In one example, the analyte is glucose and the chemical is a glucose metabolizing enzyme, and in another example, the analyte is glucose and the chemical is insulin or an appropriate pharmaceutical. As a result, the membrane may integrate material transport control functions, chemical sensing, and chemical release (i.e., actuation).

In still another example membrane with multiple coatings, the plurality of carbon nanofibers includes a first group of fibers and a second group of fibers. The first group of fibers and the second group of fibers are formed in a structure that contains a chemical, and the first group of fibers and the second group of fibers are electrically connected. The first group of fibers has a first coating suitable for generating an electrical potential upon detection of an analyte (e.g., an oxidase for electrochemically sensing glucose), and the second group of fibers has a second coating that changes volume upon pH change (e.g., an acrylimide/poly(propylacrylic) acid copolymer). The change in volume of the second coating from the sensing of the pH change by the first coating releases the chemical from the structure. As a result, the membrane may integrate material transport control functions, chemical sensing, and chemical release (i.e., actuation).

In another embodiment of the invention, individually addressable carbon nanofiber electrodes can be integrated with the membrane to provide a chemical, optical or electrical driving force for material transport and a chemical, optical or electronic interface to the fluid for control and detection. In one form of the membrane, at least two of the fibers are bonded to separate conductive leads, and the separate conductive leads are in electrical communication with a source of electricity and are used to create an electrical gradient between fibers.

In yet another embodiment of the invention, individually addressable carbon nanofiber electrodes can be integrated with the membrane to provide selective ion transport (i.e., ion permselectivity) similar to ion exchange polymers. This mode of transport is possible when the passage is small relative to the electrical double layer. Excess charge density resulting from electrical charge or molecular coating can build up in the passage enabling the transfer of oppositely charged ions and rejecting the transport of similarly charged ions.

In still another embodiment of the invention, there is provided a structure for controlling transport of a material. The structure is suitable for use as a cell mimic. The structure comprises a membrane enclosure having at least one wall, and at least a portion of one wall comprises a plurality of spaced apart fibers having a fiber width of 250 nanometers or less. A material is located within the membrane enclosure. The material has a chemical or physical property such that the material is restricted from passing from one side to an opposite side of the fibers. The membrane enclosure may comprise the plurality of fibers, a substrate, and a cover, with the plurality of fibers being connected to and extending away from a surface of the substrate, and the fibers being aligned within 45 degrees of perpendicular to the surface of the substrate. At least one of the substrate and cover may be porous. The structure may include means for altering the cross-sectional area or the spacing of the fibers such that the material may pass from the one side to the opposite side of the fibers. One example means is a coating on the fibers that changes volume upon application of a signal (e.g., electrical, chemical, optical) to the coating.

In yet another embodiment of the invention, the structure for controlling transport of a material is provided with a one or more additional membrane enclosures, each of which may include a material restricted from passing out of the enclosure. The additional membrane enclosures have at least one wall in common with another enclosure such that at least a portion of one wall comprises shared spaced apart fibers with another enclosure. Means are provided for altering cross-sectional area or spacing of the fibers such that the materials may pass from one membrane enclosure to another membrane enclosure. One example means is a coating on the fibers that changes volume upon application of a signal (e.g., electrical, chemical, optical) to the coating.

EXAMPLES

The following examples are intended only to further illustrate the invention and are not intended to limit the scope of the invention which is defined by the claims. Actual examples are written in past tense, while prophetic examples are written in a tense other than past tense in order to distinguish between the two.

Example 1

Synthesis of Deterministically Grown Carbon Nanofibers

The inventors of the present application have developed methods for catalytically controlled growth of vertically aligned (i.e., perpendicular to the substrate surface), multi-walled carbon nanofibers (see Merkulov et al. articles referenced above). The basic process utilizes plasma-enhanced chemical vapor deposition (PE-CVD) in conjunction with E-beam lithography for the precise placement of evaporated and size-controlled catalyst-metal dots. A mixture of acetylene ($C_2H_2$) and ammonia ($NH_3$) is used as a source gas during the PE-CVD process. The substrate is heated above approximately 600° C. After the plasma is turned on, carbon nanofibers grow selectively at the locations where catalyst dots (Ni, Fe, Co) were pre-deposited. The procedure is outlined in FIG. 1, and Example 5 below describes one method that has been used to produce vertically aligned multi-walled carbon nanofibers. This method is similar to the hot-filament PE-CVD technique used by Ren et al. to grow vertically aligned carbon nanofibers. (See Ren et al., "Growth of a single freestanding multiwall carbon nanotube on each nanonickel dot," *Appl. Phys. Lett.* 75, 1086, 1999; and Ren et al., "Synthesis of Large Arrays of Well-Aligned Carbon Nanotubes on Glass", *Science*, 282, 1105-1107.1998.) However, in the method of the inventors, no hot filament is present and the substrates are heated directly by placing them on a heater plate. This technique has the advantages of growth-temperature control and large-area deposition (rather difficult with a hot filament), and therefore creates the possibility of mass production of devices, which is critical for the practical realization of arrays of nanofiber structures. Currently, the present inventors routinely grow carbon nanofiber arrays on 4-inch wafers, and have carried out extensive measurements on the field emission of electrons from carbon nanofibers, demonstrating that they are electrically conductive. The electrochemical experiments described below demonstrate this. Consequently, this catalytically controlled carbon nanofiber-growth technique is a powerful self-assembly method that allows for the precise placement and then directed growth of a functional element with a nanoscale diameter and a length that can reach several microns.

Example 1a

Figure 2:
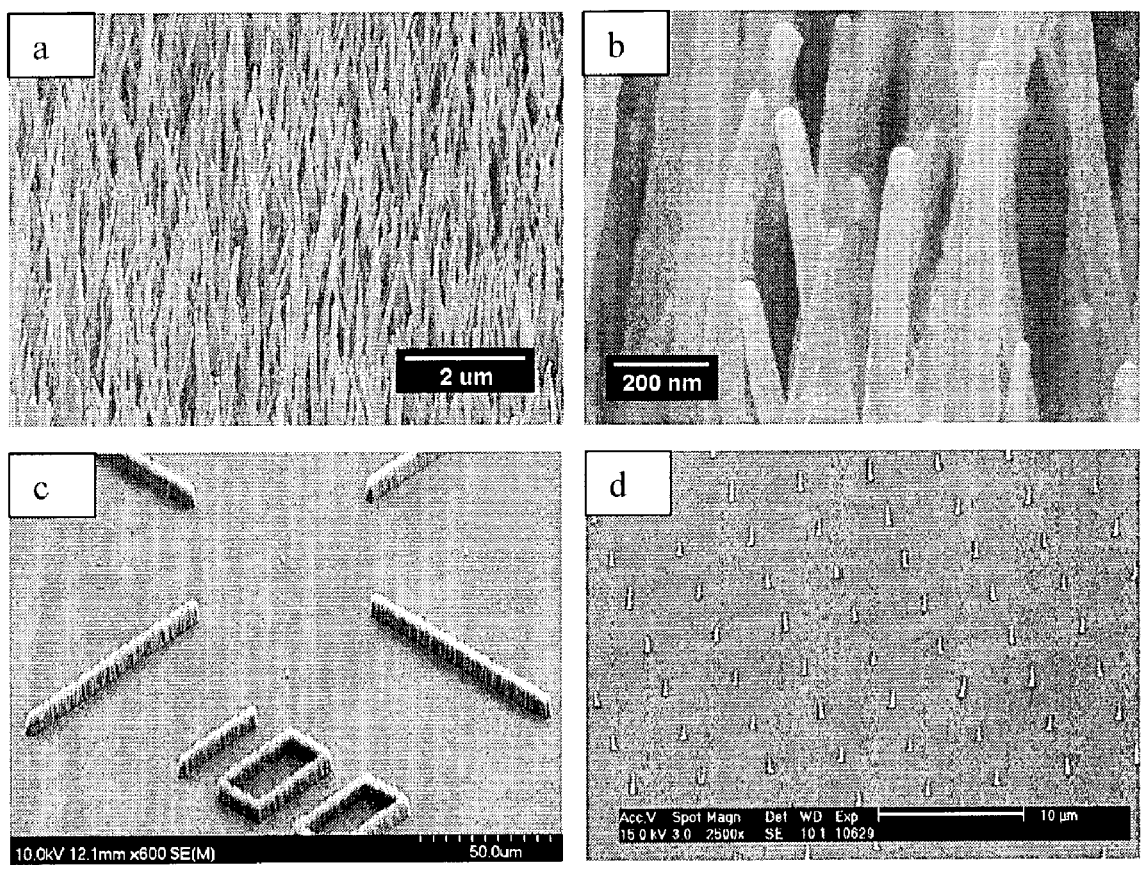
FIG. 2 shows electron micrographs of vertically aligned carbon nanofibers. Images (a), (b), and (c) display fibers grown randomly from a stripe of catalyst. Images (c) and (d) display fibers grown from individual catalyst particles positionally defined by lithography techniques.

Examples of carbon nanofibers grown from lithographically defined catalyst dots are shown in FIG. 2. FIGS. 2a-c shows images of carbon nanofibers (CNFs) grown as "chaotic forests". The CNFs were grown from catalytic metal particles that are randomly distributed on the surface. The metal particles are seen at the tips of the fibers in FIGS. 2a and b. After growth of the fibers, these catalytic particles can also be removed.

When VACNFs are grown chaotically, there is less control of the relative location of catalyst nanoparticles, or the size of the particles. However, these chaotic forests of VACNFs can be grown in lithographically defined areas as seen in FIG. 2c. Alternatively, VACNFs can be prepared in a completely deterministic fashion by precise patterning of the catalyst metal particle. In this approach, the patterning of the particles determines the VACNF location, the size of the catalyst particle defines the diameter of the VACNF, and growth time determines the length of the VACNF. Nanofibers with tip diameters as small as 5 nanometers (larger at the base), and with center-to-center spacing below 50 nanometers have been grown. The aspect ratio of the fibers can be controlled to create conical structures. Examples of VACNFs, grown from lithographically defined patterns, are shown in FIGS. 2c and 2d. FIG. 2c displays patterns of both photolithographically defined, chaotically grown VACNFs as well as individual fibers (one can be seen at the intersection of the cross hairs). The VACNFs are quite robust and compatible with microfabrication techniques. They withstand a variety of processing phenomenon including reactive ion etching and plasma enhanced chemical vapor deposition.

Example 2

Fabrication of Addressable Electrochemical Nanofiber Probe Arrays

Figure 4:
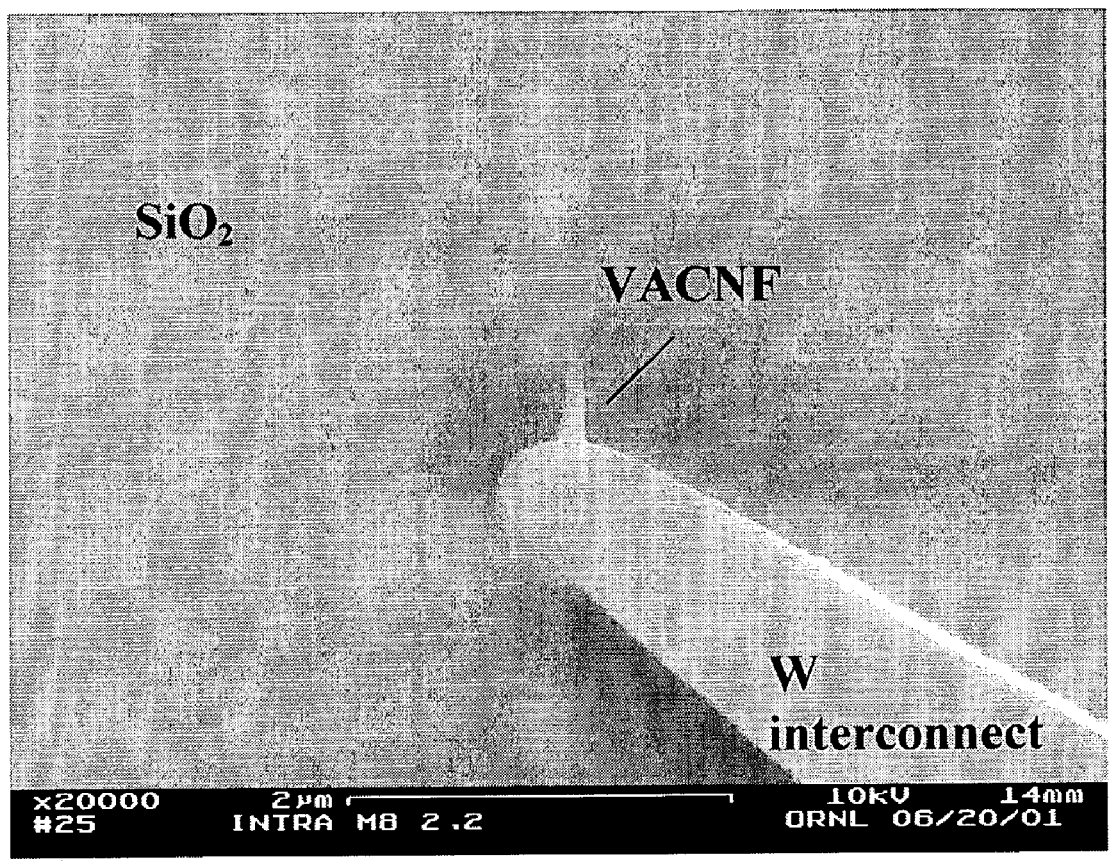
FIG. 4 shows one nanoscale element of a multielement nanofiber array. Tungsten (W) metallization is used for independent addressing of individual fiber probes.

A fabrication technique has been developed that provides multielement nanoscale probing arrays with each fiber element featuring independent addressability, and an exposed electrochemically active tip of approximately 20-30 nanometer diameter (FIG. 4) (See Guillorn et al., "Individually addressable vertically aligned carbon nanofiber-based electrochemical probes", *J. Appl. Phys.*, 91(6), 3824-3828, 2002). These devices may be fabricated on traditional Si wafers, or upon quartz wafers, facilitating their use upon fluorescent microscopy platforms. Tungsten interconnects provide wire-bond connectivity to individual elements of fibers that are deterministically grown at the opposing terminus of tungsten leads. The entire structure (interconnects and fiber sheath) is passivated with a high-quality oxide, such that electrochemical activity is limited to only the extreme exposed tip of each fiber element. These native carbon electrode surfaces feature wide electrochemical potential windows (1V to −1.3V vs. standard calomel electrode in 150 mM KCl) and low background currents (pA). In contrast to traditional scale carbon fiber/tube electrodes (fabricated using pulled glass capillary methods with diameters from 100 nm to several microns), the dramatically reduced surface area of nanofiber probes can provide for very high frequency electrochemical analyses, due to the reduced capacitance, and reduced background currents.

Example 3

Chemical Functionalization of Carbon Nanofibers

Figure 9:
FIG. 9 shows that with plasma-enhanced chemical vapor deposition, nanofibers may be conformally coated with material (pictured, 40 nm. silicon oxide).
Figure 10:
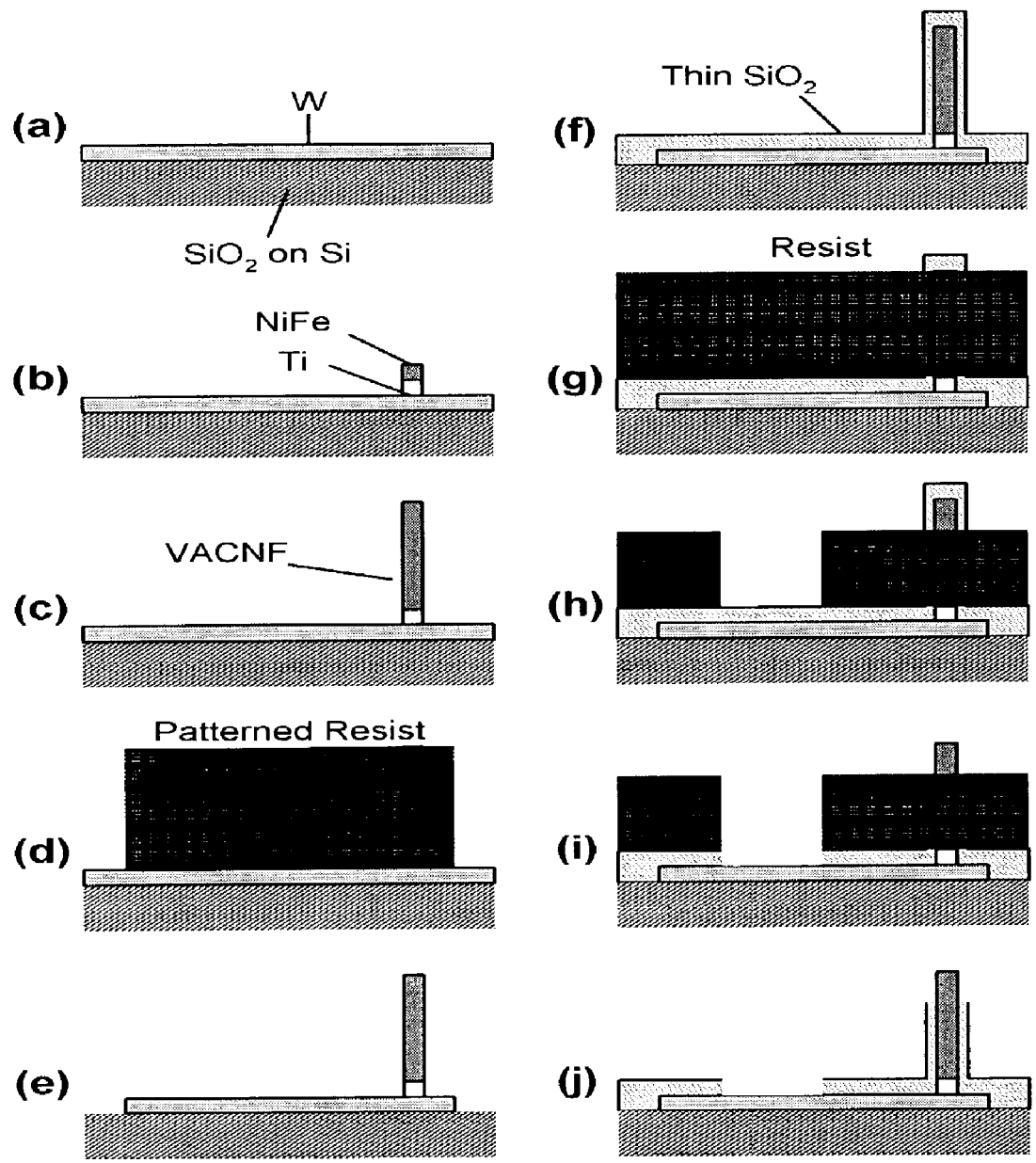
FIG. 10 shows a fabrication process for preparing independently addressable fiber elements.

While native carbon fibers provide for rich surface chemistries, the utility of our fiber-based sensor platforms may be expanded dramatically by physical modifications at the time of fabrication. We have demonstrated that plasma enhanced chemical vapor deposition and sputtering may both be used to provide very conformal coatings of oxides and metals on these high aspect ratio structures (FIG. 9). PECVD silicon dioxide coating enables use of a broad spectrum of silane-based surface modification techniques that have been developed largely for derivatization of silica-based microfluidic and microcapillary platforms. These techniques provide highly controlled modification of surface charges and hydrophilicity of our nanoscale structures, as well as nanoscale manipulation of membrane pore diameters using both electrical- and pH-modulation of polymeric composites (described below in Example 5). Metal coatings may be implemented to provide electrochemical catalysis at exposed active probe sites (Netchiporouk et al., "In vivo brain glucose measurements: differential normal pulse voltammetry with enzyme-modified carbon fiber microelectrodes", *Anal. Chem.*, 68, 4358-4364, 1996; and Wang, Analytical Electrochemistry, John Wiley and Sons, Inc, New York, 2000), and to provide selectivity to chemiphysical adsorption of materials within nanoscale membrane structures (Lee et al., "pH-switchable, ion-permselective gold nanotubule membrane based on chemisorbed cysteine", *Anal. Chem.*, 73(4), 768-75, 2001). These conformal coatings can also be exploited to reduce the interfiber spacing as in Example 5 below.

Using photolithographically patterned PECVD and sputtering techniques, spatially selective metal and oxide deposition onto both singular nanoscale probing elements and multielement nanofiber-based membrane mimic regions can be demonstrated. These coatings can be used for subsequent derivatization processes, including covalent surface modification with silane chemistries (to modify membrane transport properties), and to expand electrochemical probing capabilities (using metals as catalysis sites for electrochemical probing and actuation).

Chemical functionalization of the VACNF structures is necessary for constructing nanofiber sensors and for enabling selective transport and actuation properties when functioning as a membrane structure. Chemical functionalization can provide the essential interface between the solution phase entities desired to detect and control. Therefore, chemical derivatization schemes that alter the chemical and physical properties of the VACNFs should be used. These approaches exploit either the formation of carboxylic acid functionalities at the ends, as well as at sites of structural defects, for subsequent derivatization or physiadsorption strategies involving more complex interactions. Examples in this latter category include the adsorption of organics and complex polymers. In addition to these chemical-coupling schemes, the ability to electrically address the VACNFs enables other derivatization schemes to be considered. These include the physical masking and unmasking by gold plating or the formation of electrogenerated polymers. Assessment of the different chemical coupling strategies described below can be performed using a combination of fluorescence microscopy, electron microscopy, various surface analysis techniques and experimental testing in fluidic structures.

Figure 3:
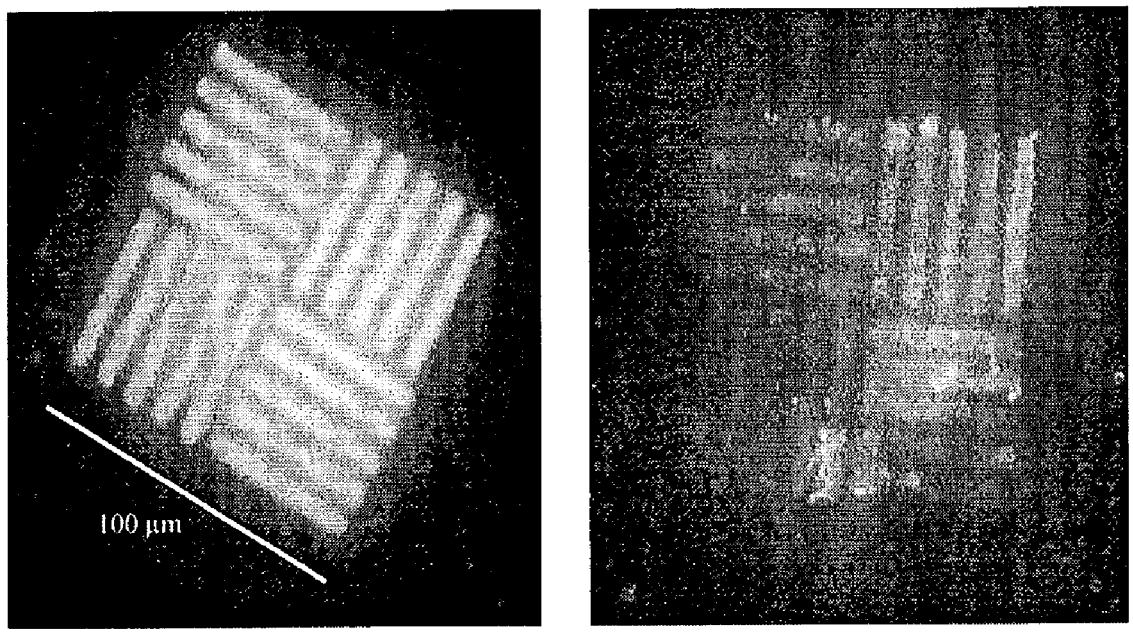
FIG. 3 shows fluorescent micrographs of a vertically aligned carbon nanofiber pattern labeled with fluorescently tagged avidin (image of left). On the right is shown the same pattern of vertically aligned carbon nanofibers after reacting with fluorescein labeled biotin.

Experiments to chemically modify VACNFs were carried out and have revealed a strategy for coupling biomolecules to the carbon nanofibers. This approach is based on the specific physiadsorption of a class of heterocyclic aromatic compounds typically used for fluorescent labeling of biomolecules. For example, compounds such as tetramethylrhodamine or rhodamine B specifically physiadsorb to the VACNFs. This specific interaction enables a convenient approach to coupling biomolecules or other functionalities to the sidewalls of the carbon nanofibers as well as a convenient fluorescent labeling method for visualization and assessment of the reaction. As the compounds are commonly used as biological labels, a variety of modified dyes are available for coupling to free amines of proteins or other compounds (available from Molecular Probes, Eugene, Oreg., USA). For example, FIG. 3 displays a pattern of VACNFs that were functionalized with the protein avidin that was labeled previously with tetramethylrhodamine. The distinction between the binding characteristics of tetramethylrhodamine and fluorescein also enables the assessment of binding to the immobilized protein. For example, fluorescein labeled biotin is observed to specifically bind to avidin treated VACNFs (FIG. 3).

Example 3a

Physiadsorption Strategies

One approach to chemical derivatization builds on observations of specific physiadsorption of specific heterocyclic aromatic compounds. The advantage of physical adsorption is its simplicity. As described above, these compounds are typically used for fluorescent labeling of biomolecules and provide a convenient method for assessing the binding with molecules to VACNFs. Also, VACNFs can be functionalized with a variety of chemical and biological ligands. Chemical treatments that influence the hydrophobicity and hydrophilicity can be examined. For example, glycols or alkyl amines can be used to increase the hydrophilic character or long chain alkanes can be used to impart a hydrophobic characteristic. Such chemical treatments may also be useful for controlling non-specific binding as would be useful for preventing membrane fouling. Ion exchange mechanisms are also easily conceived as are the coupling of specific proteins or nucleic acids. Such reagents may be useful for facilitating the diffusive transport of particular species as described below in Example 5.

Example 3b

Covalent Coupling

Figure 11:
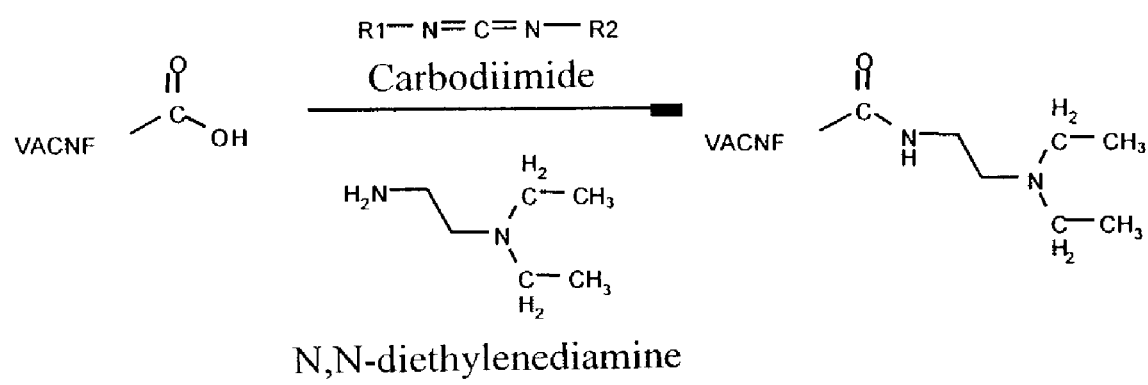
FIG. 11 shows a reaction scheme for derivatizing free carboxylic acid groups on a vertically aligned carbon nanofiber with N,N-diethylenediamine.

Covalent coupling strategies may afford a more stable linkage than the previously described physiadsorption strategy. Chemical crosslinking to the VACNFs can be possible through the carboxylated defects on the fiber surfaces. These free carboxyl groups should be available for chemical derivatization by activation with carbodiimides and subsequent reaction with primary amines. A variety of crosslinking agents, useful for coupling proteins, are available from Pierce Endogen which can be used to crosslink the VACNF to polymers, proteins or other biomolecules. For example, the available carboxyl groups on the VACNFs may be derivatized with carbodiimide ($R_1$—N=C=N—$R_2$), such as dicyclohexyl carbodiimide or 1-[3-(dimethylamino)propyl]-3-ethyl carbodiimide hydrochloride, and reacted with N,N-diethylethylenediamine to create a surface that is similar to anion exchange chromatography resins. This reaction scheme is outlined in FIG. 11. Derivatizations with other substrates can follow a similar scheme.

Another surface that is available for covalent coupling is the substrate surface from which the VACNFs are grown. This surface is typically glass or silicon and can be conveniently derivatized using a variety of silane reagents, such as triethoxyaminopropylsilane, or by other procedures. These sorts of immobilization techniques are known (see Subramanian et al., "Comparison of Techniques for Enzyme Immobilization on Silicon Supports", *Enzyme and Microbial Technology*, 24, 26-34, 1999) and could be exploited for position-dependent immobilization. Likewise, conformal coatings of silicon dioxide and other oxides on CNF can be used as another surface for derivatization.

Coatings of gold or other metals on CNF can also be used as another surface for derivatization. In particular, gold coatings are amenable to coupling using thiol chemistries.

Example 3c

Physical Masking

Physical masking can allow for serial functionalization of different VACNFs by the previously described physiadsorption or covalent coupling strategies. Several techniques can be considered. For example, lithographic approaches using photolabile-protecting groups are routinely employed for the construction of DNA microarrays (Fodor et al., "Light-Directed, Spatially Addressable Parallel Chemical Synthesis," *Science*, 251, 767-774, 1991). Another procedure could involve the use of lithographic masks and conventional photoresists. McGall et al. have used such a procedure for the immobilization of oligonucleotides (see "Light-directed synthesis of high-density oligonucleotide arrays using semiconductor photoresists," *Proc. Natl. Acad. Sci. USA*, 93, 13555-13560, 1996). The general procedure involves derivatizing the surface with an appropriate reactive group, overlaying with resist, exposing and developing the resist, and finally conjugation and stripping of the resist. The entire procedure could be repeated for subsequent derivatizations. This procedure would be compatible with VACNFs since the fibers can withstand photoresist application and stripping. Alternately, the lithographic approach can be combined with a photo activatable substrate such as caged biotin. An analog of biotin, such as photobiotin (N-(4-azido-2-nitrophenyl)-N'-(N-d-biotinyl-3-aminopropyl)-N'-methyl-1,3-propanediamine available from Pierce Endogen) can be used to specifically pattern biotin on substrate surfaces (see Hangsakul et al., "Protein patterning with a photoactivatable derivative of biotin," *Bioconjugate Chem.*, 7, 249-254, 1996). Covalent attachment of the reagent occurs upon exposure to UV light (350-370 nm) allowing subsequent conjugation to biotin, through avidin, in defined regions. Such a procedure may be useful for immobilizing proteins by crosslinking.

Another readily accessible physical masking technique is the coating and removal of gold from the VACNFs. Evaporative deposition methods may be used to specifically layer gold onto the VACNFs. Conformal layering of gold can be addressed. Patterning of this layer can enable directed chemical attachment through formation of self-assembled monolayers (SAMs) of thiol containing alkanes, terminated in chemically reactive groups. This new coating can offer an alternate surface for chemical addition, different from the uncoated VACNFs. Alternately, an electrochemical deposition and removal method can be developed. For this approach, the VACNFs can be electrically connected to a remote electrode by VACNF growth over an appropriate conducting layer (as described in Example 1). These electrically addressable fibers can then be specifically coated with gold for either chemical derivatization with SAMs, or the gold coating can be used as a physical mask. A recent description of electrochemical dissolution of a gold anode has shown that such a coating can be selectively removed (Santini et al., "A controlled-release microchip," Nature, 397, 335-338, 1999).

These different physical masking techniques could be integrated for specific chemical derivatization along the length of the fiber. Using the same techniques implemented to provide electrochemically-active carbon tips upon silica-insulated nanofiber sheaths, it can be possible to bury the bottom of a VACNF in resist, or oxide, and apply selective chemical coatings to the exposed portion. Such an approach may be useful for orienting macromolecules or forming complex chemical patterns along the length of the fiber.

Example 3d

Electro-Polymerized Polymers

Another approach for chemical derivatization of the VACNF also exploits their ability to be addressed as electrodes. Electro-polymerization of conducting polymers such polypyrrole, as well as others such as polyaniline, polyacetylene, polyindole and polythiophenes, are available for the fabrication of electrochemical biosensors (see Cosnier, "Biosensors based on immobilization of biomolecules by electrogenerated polymer films", Applied Biochemistry and Biotechnology, 89, 127-138, 2000). For example, two applications involving the combination of VACNFs and addressable synthesis of electro-generated polymers are available. These applications include a technique for conjugating biomolecules or other species and a technique for modulating the interfiber spacing.

For controlled conjugation, polypyrrole polymers can be synthesized onto electrically addressable VACNFs. The basic approach involves either the entrapment of the biomolecule during polymerization or covalent coupling of the biomolecule either during or after polymerization (See Cosnier, "Biosensors based on immobilization of biomolecules by electrogenerated polymer films", Applied Biochemistry and Biotechnology, 89, 127-138, 2000; and Bidan et al., "Electropolymerization as a versatile route for immobilizing biological species onto surfaces", Applied Biochemistry and Biotechnology, 89, 183-193, 2000). Selected biomolecules can be mixed with the electropolymerizable monomer. Upon application of the appropriate potential, polymerization can occur thus entrapping the biomolecule. It is unclear as to what the mechanism for entrapment is, though the protein may incorporate as a counter ion, or it may be that the protein happens to be in the proximity during the polymerization process. It is known that the accessibility of proteins within the layer and the incorporation of large proteins are rather low (see Cosnier above). Therefore surface conjugation with either pyrrole modified with reactive groups or subsequent incorporation of biomolecules derivatized with pyrrole could increase protein accessibility.

The ability to controllably grow a polymer may also allow for further control of the interfiber spacing. Careful monitoring of the current during polymerization could allow for reproducible polymer coatings. Such a technique would allow for altered fiber spacing without the use e-beam lithography. Sub-micron films of electrogenerated polymers have been formed, though the surface characteristics were found to be irregular when studied by atomic force microscopy (Smela and Gadegaard, "Controlled folding of micrometer-size structures," Science, 268, 1735-1738, 2001). The performance characteristics of these thin films can be assessed empirically by transport measurement techniques described in Example 5, and quantitatively by atomic force microscopy.

Example 4

Multiple Length Scale Devices

We have achieved carbon nanofiber growth and incorporation into microscale and beyond structures. We have grown CNFs with selected tip diameters between 5 and 100 nm., lengths up to several 10's of microns, and spacings down to 50 nm. or less. Our growth method allows the control of CNF shape, chemical composition, and orientation. Furthermore, our growth method operates at the wafer scale (we have grown CNFs on up to 4" wafers), which allows the use of standard microfabrication techniques on CNF-containing wafers. Thus, we have constructed several microscale devices that include functional nanoscale CNF components.

Fabrication of individually addressable, electrochemically-active fiber arrays on planar substrates is an example of a multiple length scale device as discussed in Example 2. We have successfully integrated fully-processed 4-element nanofiber arrays with microfluidic channels of 20 µm width and 25 µm depths. These devices are then further integrated with macroscale wiring platforms using wirebonding to interface to the 4 individual elements of the nanofiber array. This integration provides the ability to efficiently deliver calibration solutions to the device using well-developed microfluidic techniques (See McKnight et al., "Electroosmotically induced hydraulic pumping with integrated electrodes on microfluidic devices", Anal. Chem., 73(16), 4045-4049, 2000; Gottschlich et al., "Integrated Microchip Device for the Digestion, Separation, and Postcolumn Labeling of Proteins and Peptides", J. Chromatogr., B745, 243-249, 2000; Khandurina et al., "Integrated System for Rapid PCR-Based DNA Analysis in Microfluidic Devices", Analytical Chemistry, 72 13, 2995-3000, 2000; and Jacobson et al., "Microfluidic Devices for Electrokinetically Driven Parallel and Serial Mixing", Analytical Chemistry, 71, 20, 1999.) Microfluidic delivery also enables unprecedented control over cleaning steps (i.e., 1% sulfuric acid washes to remove organic contaminants) and fiber derivatization procedures. These platforms provide extensive capability for the characterization of nanofiber probes, and the ability to interface these probes with smart sensing and actuating platforms.

Example 4a

Preparation of Multiple Length Scale Devices

To facilitate handling, implementation, and characterization of multiple length scale structures, the structures and microscale fluidic manifolds can be integrated. Rapid prototyping techniques as well as direct processing of mechanical and fluidic structures can be employed. Microchannel devices can be fabricated by casting polydimethylsiloxane (PDMS, Sylgard 184) onto negative relief patterns on silicon or SU-8 (see McKnight et al., "Electroosmotically induced hydraulic pumping with integrated electrodes on microfluidic devices", Anal. Chem., 73(16), 4045-4049, 2001; and Zhang et al., "Controlled Particle Transport Across Vertically Aligned Carbon Nanofiber Barriers," *Applied Physics Letter*, vol. 81, No. 1, 2002). Following a cure at 65° C., PDMS channel devices can be peeled from the negative mold and macroscale reservoir structures can be excised from the manifold. This structure may then be directly integrated with our nanofiber substrates, and may be iteratively installed and removed to enable subsequent access to internal structures. This manifold may also be irreversibly sealed to CNF containing substrates. Briefly, the PDMS is cleaned using ultrasonic processing in a detergent (Branson ultrasonic cleaning fluid), followed by methanol, followed by deionized water. The PDMS manifold and nanofiber substrate are then exposed to a brief cleaning in an oxygen plasma chamber and are then mated together under an optical microscope to form an irreversible bond between the PDMS and the quartz substrate of the nanofiber array. This technique typically provides more robust sealing of underlying structures and an overall more-rugged device. The resultant devices are optically transparent and well suited for integration with optical and fluorescent microscopy. Electrical interconnects may be wirebonded to enable interfacing to macroscale instrumentation. The fluidic platform may then be used to deliver analytes to the multiscale fiber elements, including standard analyte solutions, as well as cleaning solutions (e.g. 1% sulfuric acid washes). Programmed analyte concentration profiles may also be provided using standard syringe pumping or electrokinetic manipulations that have been demonstrated.

Example 5

Membrane Demonstration

Stripes of vertically aligned carbon nanofibers (VACNFs) were used to form membranes for size selectively controlling the transport of latex beads. Fluidic structures were created in poly(dimethylsiloxane) (PDMS) and interfaced to the VACNF structures for characterization of the membrane pore size. Solutions of fluorescently labeled latex beads were introduced into the PDMS channels and characterized by fluorescence and scanning electron microscopy. The results showed that the beads size selectively pass through the nanofiber barriers and the size restriction limit correlates with the interfiber spacing. The results also suggest that altering VACNF array density can alter fractionation properties of the membrane. Such membranes would be useful for molecular sorting and for mimicking the properties of natural membranes.

Vertically aligned carbon nanofibers (VACNFs) were prepared by a catalytically controlled plasma enhanced chemical vapor deposition (PECVD) process that allowed for their directed assembly. To prepare the membrane structures, VACNFs were grown on a 3 cm.×3 cm. n-type-(100)-oriented silicon substrates. A 10-nm.-thick layer of nickel-iron (1:1) alloy on a 10-nm.-thick titanium adhesion layer was deposited on the substrates. The Ni/Fe layer was used as a catalyst for growth of the VACNFs. The catalyst was patterned using contact photolithography to form 50 micron wide catalyst stripes or by deposition of the catalyst through a shadow mask consisting of a blade cut slit in aluminum foil resulting in irregularly shaped catalyst lines. Acetylene ($C_2H_2$) as the carbon source and ammonia ($NH_3$) as an etchant, at gas flow rates of 65 and 80 sccm respectively, were used in the PECVD process. The dc plasma discharge was operated at 100 mA and the growth temperature was 710° C. In all cases, the growth rate and time were selected to produce nanofibers with a height of approximately 2.2-2.4 microns. A "forest" of nanofibers, randomly spaced within the catalyst stripe, resulted.

Fluid channel structures were prepared by casting poly-(dimethylsiloxane) (PDMS) (Dow Sylgard 184) onto a silicon positive relief mold. The mold was prepared using photolithography and reactive ion etching. Both 50 and 100 micron wide channels, 2 microns deep and 1.5 cm. long were fabricated by pouring a 10:1 mixture (elastomer; curing agent) of PDMS onto the mold, followed by a 65° C. cure for 1 hour. The resulting channel structure was peeled from the mold and overlaid on the VACNF containing silicon substrate with the PDMS channel oriented perpendicular to the VACNF stripe as shown in FIGS. 5A, 5B and 5C. The channels were constructed to be slightly shorter than the fiber height so that the VACNFs could presumably extend into the soft PDMS lid forming a floor to ceiling barrier. The PDMS afforded relatively good sealing to the silicon base and its transparency allowed for convenient viewing of the experiment.

The transport of fluorescently labeled latex beads was used to assess the VACNF membrane performance. Beads of various diameters, ranging from 100 to 1000 nanometers (Polyscience, Inc.), were diluted to 0.15% in an aqueous solution containing 1% sodium dodecyl sulfate. These solutions were introduced at one end of the open channels, and the transport of the beads was monitored using a Zeiss Axiovert 135 fluorescence microscope. Bead flow proceeded by a combination of capillary action and hydrostatic pressure. A high-resolution scanning electron microscope was used to study the morphology of the VACNFs and the distribution of latex beads after the fluidic experiment.

In the case of the 100 micron wide PDMS channel, beads smaller than approximately 500 nanometers diffused through the fiber barrier, while larger beads were halted at the barrier. Fluorescence on both sides of the barrier indicated that the beads traveled through the VACNFs, while fluorescence on only the input side of the barrier indicates that the beads were halted. Beads below 500 nanometers were able to travel through the barrier in the 100 micron wide channel, while the transport of larger beads was halted. In all experiments, beads collected at the entrance to the fiber barrier, even in the case of the smallest beads (100 nanometers). These observations were consistent with measurements of the interfiber spacing of approximately 250±150 nanometers, as determined by electron microscopy. Thus by controlling the density of the nanofibers, the pore size of the membrane can be controlled. FIGS. 6 and 7 below show the results of such an experiment for 500 nanometer diameter beads. Post experiment electron micrographs, such as that shown in FIG. 7, support the data obtained by fluorescent microscopy and demonstrates the robustness of the fibers to mechanical and fluidic forces.

Post experiment electron micrographs demonstrate the robustness of the nanofibers to mechanical and fluidic forces. Before acquiring these images, the channels were dried and the PDMS layer was removed. There was no apparent damage to the VACNFs. For experiments where beads were observed to traverse the CNF barrier, some beads were observed at the downstream end of the channels and trapped within the fiber array. For cases where the VACNF barrier completely blocked transport, beads were observed to accumulate only at the entrance to the VACNF membrane.

Thus, PDMS channels containing a stripe of VACNFs were used as initial fluidic structures to characterize the use of VACNFs as membrane structures. Fluorescently labeled latex beads size selectively traveled through the nanofiber barriers, and various widths and shapes of fiber array had different effects on the transport behavior of the beads. Therefore, VACNF arrays can serve as synthetic membranes and may be employed for controlling molecular transport.

Example 5a

Size Selective Transport

The ability to precisely design and construct VACNF barriers within fluidic channels can provide a superlative analytical tool for characterizing their membrane-like properties, as described above. Assessment of the interfiber spacing can be accomplished using several well-characterized macromolecules. These include proteins that are commonly used as molecular weight standards in conventional chromatographies. For example, a-lactoalbumin (M.W., 14,200), carbonic anhydrase, (M.W., 29,000), alcohol dehydrogenase, (M.W., 39,800), bovine serum albumin (BSA) (M.W., 66,000), β-galactosidase (M.W., 116,000), IgG (M.W., 160,000), and myosin (M.W., 205,000) are all available from either Sigma-Aldrich or Pierce Chemical Company as fluorescently labeled size standards. These molecules all have previously characterized diffusion coefficients and span a broad range of sizes. For example, previously characterized Stoke's radii for BSA, IgG, and myosin are 3.49 nm., 5.23 nm., and 19 nm. respectively (see Morris and Morris, "Molecular Sieve Chromatography," In Separation Methods in Biochemistry, Chapter 7, 418-470, Halsted Press, New York, 1976; and Ackers and Steere, "Restricted diffusion of macromolecules through agar-gel membranes," *Biochem. Biophys. Acta,* 59, 137-149, 1962). Other proteins are also commercially available, such as fibrinogen (M.W., 330,000), and can be easily labeled with fluorescent reagents (commercially available from Pierce Chemical Company or others). Additionally, various length DNA molecules can be prepared or purchased as fluorescently labeled size standards. Complementing these natural macromolecules can be latex beads. These beads can be purchased from Polysciences, Spherotech Inc., Sigma-Aldrich, or others in sizes (diameters) ranging from 30 nm. to several microns. Further, these beads can be obtained with a variety of fluorescent labels and different chemical functionalities for crosslinking to proteins. Finally, low molecular weight molecules, such as fluorescein or other nanoparticles, can also be used as size standards.

The ability of these various fluorescently labeled size standards to pass through the VACNF barriers can be assessed using fluorescence microscopy. A test stand consisting of an epifluorescent microscope equipped with a cooled charge coupled device (CCD) imaging system can be used to monitor the fluorescence intensity as a function of time, substrate concentration and solution viscosity on either side of the barrier. Standard analyses, commonly used in characterizing transport across a membrane can be used to characterize the VACNF barriers (Sakai, "Determination of pore size and pore size distribution 2. Dialysis membranes," *J. of Membrane Science,* 96, 91-130, 1994). A simple characterization can employ Fick's law of diffusion. The integrated form of Fick's first law used for characterizing restricted diffusion through agar-gel membranes (see Ackers and Steer above) should also be applicable to the VACNF barriers:

$$\frac{DA}{l} = -\frac{V_i V_o}{t(V_i + V_o)} \ln \frac{(C_i - C_o)_f}{(C_i - C_o)_i}$$

where D is the diffusion coefficient, l and A are the length and cross sectional area of the pores created by the nanofibers, $V_i$, $V_o$, $C_i$, and $C_o$ are the volumes and concentrations on either side of the VACNF barrier, and t is the experimental duration. The concentrations can be assessed from the relative fluorescence intensity. In assessing the characteristics of the VACNF membranes, either the diffusion constants or the physical characteristics of the VACNF barriers, as determined from electron microscopy, can be used as known variables. The ability to engineer the VACNFs can allow for a clear interpretation of their restrictive properties, especially compared to membranes composed of randomly oriented polymer strands. For example, the effects of steric and frictional hindrance and pore length could be readily estimable when knowing details of the VACNF arrangement. Due to the maturity and important application of membrane science, extensive theoretical characterizations have been conducted previously. A theoretical understanding of diffusion across the VACNF barriers can enable later designs that define the limits of containment and the influence of chemical derivatizations (discussed above) for further defining VACNF transport barriers.

Example 5b

Facilitated Transport

Figure 12:
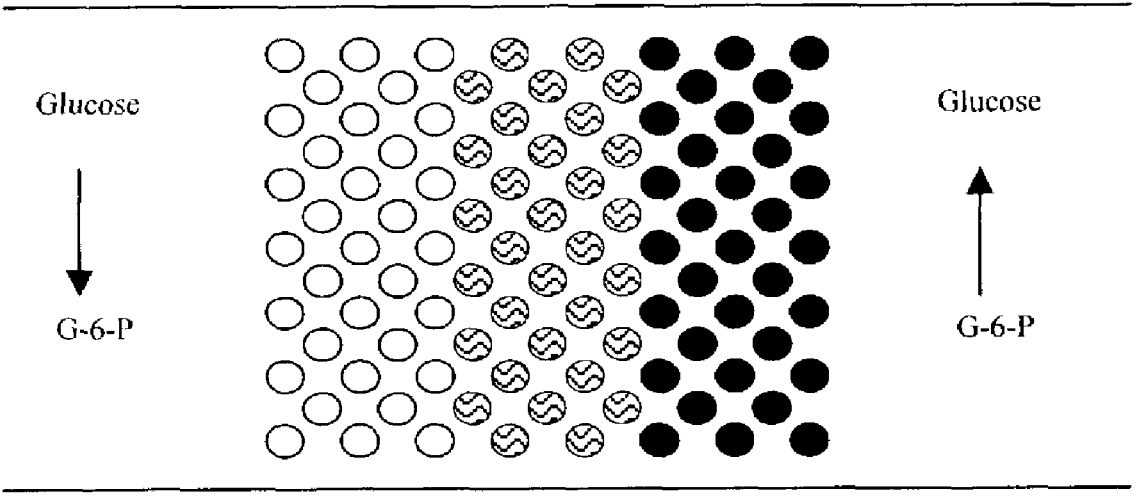
FIG. 12 shows enzymic facilitation of glucose across a vertically aligned carbon nanofiber barrier.

Development of facilitated transport techniques can enable selective transport characteristics that are in addition to the simple size selection capabilities described above. The combination of size and chemical selection capabilities can begin to emulate features characteristic of biological membranes. Natural cell membranes exploit facilitated diffusion to pump reagents against a concentration gradient. Accomplishing a similar feat with artificial membranes can be extremely useful for concentrating reagents on one side of the membrane or to enhance detection sensitivity when used with a sensing device. Several facilitated transport schemes have been developed using conventional artificial membranes (i.e. nylon membranes). For example, anion exchange membranes have been used with borate complexes to facilitate the transfer of glucose against a concentration gradient (see Igawa et al., "Facilitated transport of carbohydrates via complexation with borate ion fixed on an anion-exchange membrane," *Journal of Membrane Science,* 98, 177-180, 1995; and Ouahid et al., "Sorption of glucose by an anion-exchange membrane in the borate form. Stability of the complexes and the facilitated transport of glucose," *J. of Membrane Science,* 114, 13-25, 1996). Coupled enzyme systems have also been used to transport glucose (Perrin et al., "Artificial enzymic membrane pump for glucose transport against its chemical gradient," *J. of Membrane Science,* 147, 95-107, 1998). One such scheme, modeled after that of Perrin et al., is outlined in FIG. 12. In this approach, three membranes are sandwiched together. On one membrane, the enzyme glucokinase is immobilized, a center membrane is left underivatized, and the third membrane is crosslinked to the enzyme alkaline phosphatase. These enzymes catalyze the phosphorylation and dephosphorylation of glucose, respectively. The phosphorylation reaction requires a phosphate donor, which is obtained from adenosine triphosphate (ATP). The following reactions can be summarized:

glucose+ATP→glucose-6-phosphate+ADP glucose-6-phosphate→glucose+phosphate

The coupling of these enzyme systems allows for transfer of glucose by cycling glucose between two different chemical states, glucose and glucose-6-phosphate. The ordering of these reactions on different sides of the membrane facilitates the transfer of glucose against a concentration gradient.

Excess alkaline phosphatase located in the cell on the phosphatase side of the membranes facilitates this. This process is analogous to that used by biological systems and shows the potential for being engineered into artificial cellular systems such as those that use VACNFs barriers.

This facilitated transport scheme should be possible with membranes constructed from VACNFs. Chemical functionalization of the VACNFs could be used to prepare an anion exchange membrane or selective functionalization could be used to derivatize the VACNFs with enzymes. The selective functionalization schemes could utilize the chemical functionalization techniques (i.e., selective masking) described in Example 3. Ideally, the detection and quantitation of glucose could be carried out using electrochemical probes. Also, it could be possible to assess glucose transport using enzyme assays involving glucose oxidase (see Subramanian et al. above). Aliquots can be removed from appropriate sides of the VACNF barrier or assessment can be by on chip fluorogenic detection. (Molecular Probes sells an appropriate fluorogenic reagent for assaying peroxide, a product of a glucose oxidase mediated reaction.)

Example 5c

Controlled Actuation of Carbon Nanofiber Membranes

Two approaches to controlling the gating properties of the CNF membranes can be considered. Controlled transport through the membrane can serve two functions 1) controlled presentation of an analyte to an interior sensing element or 2) controlled release of a material that results from an appropriate trigger (e.g., electrical, chemical, optical).

Molecular Gating by Physical Actuation—The electrogenerated polymers described in Example 3d can be modified to create microactuators that are electrically controllable (see Smela et al., "Volume change in polypyrrole studied by atomic force microscopy," *J. Phys. Chem. B*, 105, 9395-9405, 1995; and Jager et al., "Microrobots for Micrometer-Size Objects in Aqueous Media: Potential Tools for Single-Cell Manipulation", *Science*, 288, 2335-2338, 2000). This is accomplished by incorporation of a large anion, such as dodecylbenzenesulfonate during the polymerization process. When a negative potential is applied, the polypyrrole is reduced and cations diffuse into the polymer. This results in a swelling of the polymer that is reversible upon oxidation of polypyrrole. This volume change is useful for actuation of devices and may also be useful for creating a valve structure between individual VACNFs. Upon actuation the "pore" size can be reduced or sealed. In the application of mechanical actuators, the volume change is proportional to the applied voltage. This feature may also be applicable for altering the pore size. Smela and Gadegaard (see "Volume change in polypyrrole studied by atomic force microscopy," *J. Phys. Chem. B*, 105, 9395-9405, 2001) have examined the change in volume and surface characteristics by atomic force microscopy. They found that the volume change can be on the order of 30-40% and the surface characteristics of the polypyrrole are irregular. The surface contains nodules on the order of 30-60% of the film thickness for thin films (150 nm.). The performance characteristics of these thin films can be assessed empirically by transport measurement techniques, described above, and quantitatively by atomic force microscopy.

The use of pH sensitive polymer matrices for actuation of membrane transport can also be used. PECVD oxide-coated fiber membranes can be modified using silane chemistries for the covalent attachment of pH-sensitive polymeric networks including n-alkyl acrylamides (see Saitoh, "Preparation of poly(n-isopropylacrylamide)-modified glass surface for flow control in microfluidics", *Anal. Sci.*, 18, 203-205, 2002; and Kanazawa, "Temperature-responsive chromatography using poly(n-isopropylacrylamide) hydrogel-modified silica", *Anal. Sci.*, 18, 45-48, 2002), and acrylimide/poly(propylacrylic) acid copolymers (see Kyriakides et al., "pH-Sensitive polymers that enhance intracellular drug delivery in-vivo", *J. Control Release*, 78(1-3), 295-303, 2002; and Aoyaji et al., "Novel bifunctional polymer with reactivity and temperature sensitivity", *J. Biomater. Sci. Polym. Ed.*, 11(1), 101-110, 2000). These materials feature sharp, reversible, phase transitions at physiological conditions sensitive to both temperature and pH. In addition to providing controlled gating via polymer swelling and collapse of the derivatized nanofiber membrane, the pH-sensitive phase transition can also be used to store and release materials from the polymer-hydrogel itself.

Molecular Gating by Electrical Control—As described previously, the VACNFs are electrically conductive providing an additional control and transport mechanism. Nishizawa et al. have shown that metal nanotubule membranes can show selective ion transport similar to ion exchange polymers (see "Metal nanotubule membranes with electrochemically switchable ion-transport selectivity," *Science*, 268, 700-702, 1995). This mode of transport is possible when the radius of the pore is small relative to the electrical double layer. Excess charge density can build up in the pore enabling the transfer of oppositely charged ions and rejecting the transport of similarly charged ions. They demonstrated ion permselectivity using colored ions and potentiometrically controlled electrodes. The nanotubule membranes used in their studies were formed from gold plated, polycarbonate membranes. These membranes had pore sizes on the order of ~0.8 to ~9.4 nm. The ability of VACNFs to perform ion permselectivity can also be examined. Derivatization of the VACNFs with anionic or cationic ligands, coupled with potentiometric control could enable ion permselectivity. The various chemical derivatizations, such as diethylaminoethane or carboxylic acid functionalities, described in Example 3b can be employed for their ability to selectively transport ions. This form of transport selectivity could also be possible with the conducting organic polymers discussed in Example 3d. The effect of altered pore sizes can be examined for size and charge dependent selection.

In addition to ion permselectivity, electrical addressing can also be exploited to generate electrical potential gradients on either side of the membrane. Addressable electrodes, in the form of gold pads or nanofibers can be placed on either side of the VACNF barriers. An electrical gradient can be generated to control the flux of charged species between cells. Again, charged dye molecules or labeled macromolecules can be used to monitor ion migration.

Example 6

Cell Mimics

By copying the physical features of a biological cell, including size, organized structure and nanoscale detail, a universal platform capable of multiple functions is possible. These functions include multiple sensing capabilities, signal amplification, logic processing, chemical release, mechanical actuation, and energy transformation.

Figure 8:
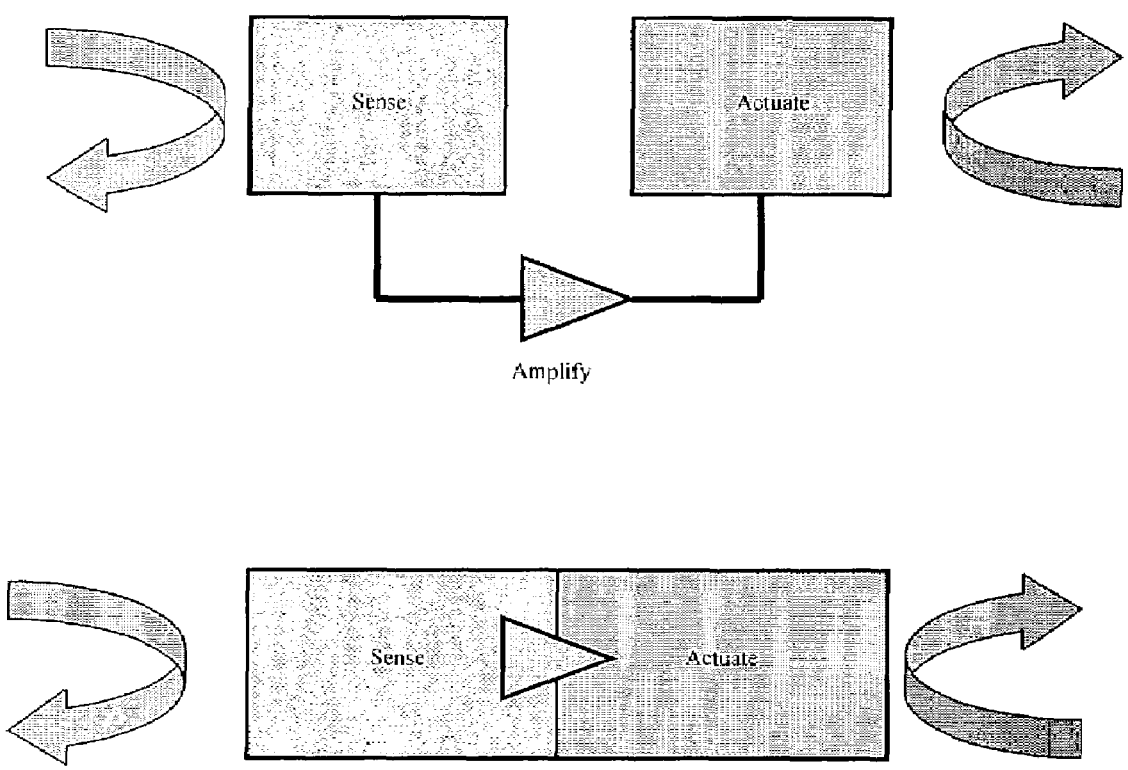
FIG. 8 is a diagram of sensing concepts. The curved arrows represent the flux of chemical information. The boxes represent the functional elements.

To accomplish this integration in an artificial system, several approaches can be considered for transducing sensing information into a desired output. FIG. 8 outlines two approaches. For example, chemical information (or physical information such as temperature and pressure) can be converted to electronic based information that is subsequently processed and results in some type of actuation, such as release of a chemical. This is diagrammed in the top of FIG. 8. A similar transformation of information can be considered where an optical based interface exists between the chemical and electronic environments. The defining feature of this signal transduction approach is the extraction of information from the chemical (solution phase) world into the man-made environment of conventional electronics. Though this is an inefficient process, relative to natural systems, these steps provide essential components that mimic cellular processing elements that are currently beyond our intellectual grasp. This basic transduction scheme is characteristic of conventional sensing schemes, but is typically conducted at much larger size scales. Such an approach can also be considered for a cellular-mimic based sensing system provided that nanoscale sensors and actuators are available. In this case, the advantages of reduced scale, such as faster response times and molecular level control, can be employed. Alternatively, an electronic interface can be avoided altogether. In this instance (bottom of FIG. 8), the information would remain in a compatible physical context (i.e. solution phase) just as it occurs in a natural cell. This situation would be ideal for biomedical applications as the requirements for external links (i.e. power, signal amplification, signal processing) could be eliminated. Further, with advanced nanoscale engineering, direct interfaces to natural cell structures may be possible. The artificial interface will aid in extracting information on the cellular scale and in characterizing and understanding a purely solution phased approach.

Development of the components of a simple, cellular-scale sensor-actuator system is contemplated. These components include development of an artificial cell structure that integrates the necessary features on appropriate length scales. Electrochemically-based nanosensors and nanosensor arrays can be developed for sensing the presence of one or multiple analytes. Additionally, other types of sensing structures and signal transduction schemes can be considered.

An artificial membrane structure that confines and selectively controls the transport of reagents can be developed. These features can be combined with an appropriate electronic interface for assessing the attributes of a cellular scale sensor. A sensing paradigm can be established using easily measured analytes.

We envision many applications for a cell mimic based sensing system. Diagnostic applications will readily derive from these developments. For example, this sensing paradigm is compatible with lab-on-a-chip formats. As we progress towards self contained systems, microscale "cells" could be dispersed into a solution to buffer a chemical condition, to act as a sentinel for particular chemical reagents or conditions, or to metabolize unwanted reagents. The robust platform derived from these materials would not limit this concept to aqueous systems. Additionally, in vivo biomedical monitoring and drug dosing can be adapted from this platform. Higher order systems, derived from multiple, interconnected cells are possible.

This example focuses on the use of carbon nanofibers as semi-permeable membranes for enclosing cell-scale fluid volumes and for controlling the presentation and release of soluble chemicals from within the artificial cell. The membrane properties can be affected by physical spacing, chemical coating and applied electric fields. One objective is to provide molecular level discrimination. The various cell-mimic components of Examples 1-5 can be integrated for demonstration and evaluation of the cell mimic based sensor-actuator concept.

Example 6a

Electronically Connected Sensor—Actuator System

Figure 13:
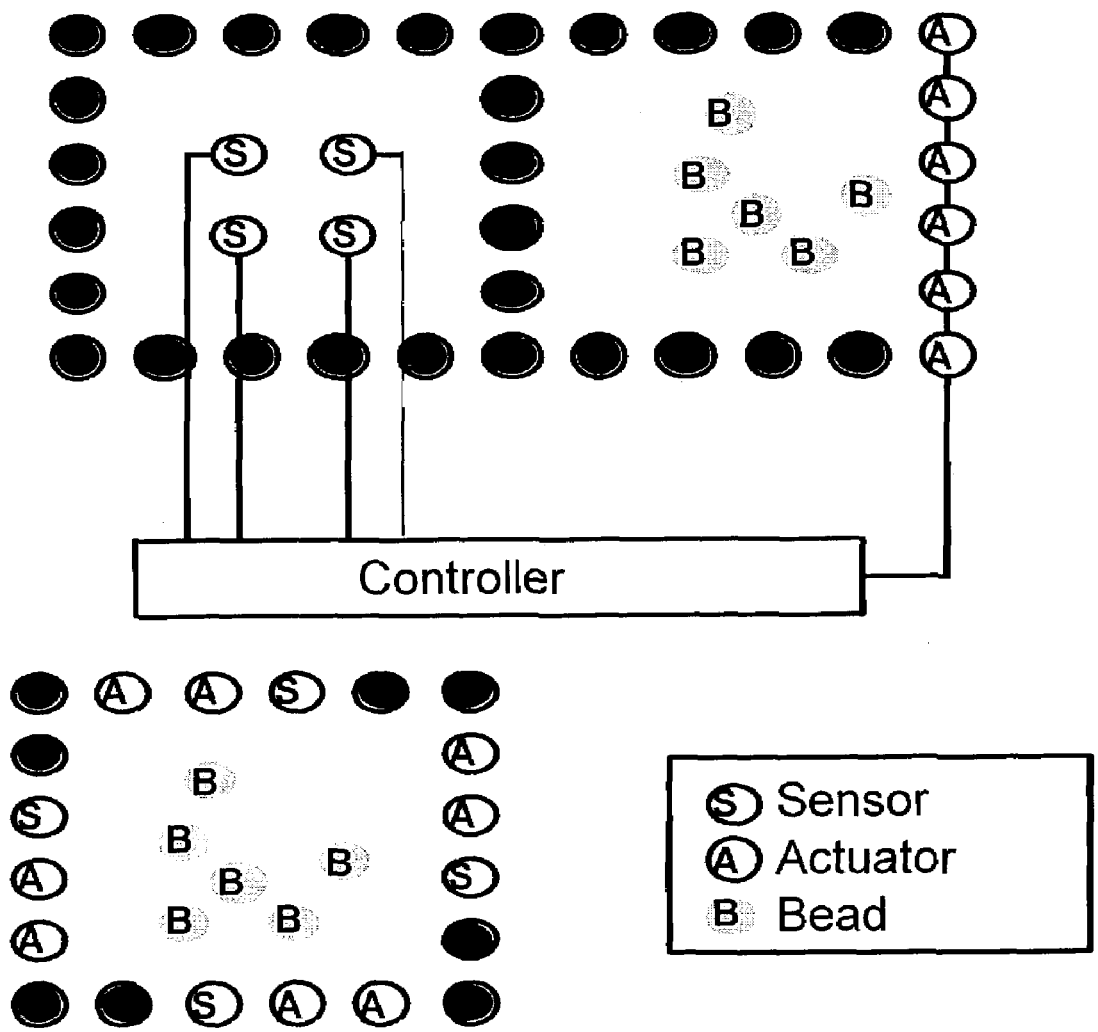
FIG. 13 shows a top view diagram of cell mimetic structures with individual fibers defined as sensors and actuators.

This approach can involve the scheme initially introduced in FIG. 8 where chemical information is converted into an electronic signal, the signal is suitably processed and fed back to the device for controlling actuation. To accomplish this, the electrochemical sensors can be surrounded by a semi-permeable membrane mimic and used for detecting glucose, or other analytes. The measured electrochemical signal can be processed using conventional electronics and used to actuate the membrane of a second structure that results in the release of a chemical. Different designs are summarized in FIG. 13. In general, it is desired to construct cell mimics with dimensions of less than 100 µm on a side. These structures can be created within larger scale fluidics structures for testing, using the techniques described in Example 4. One cell design is shown in the top of FIG. 13. In this case, the sensor and actuator elements are contained within separate cells and connected to a common signal processing element. Alternatively, the sensor and actuator elements could be contained with the same cell structure (see bottom of FIG. 13). For this situation, the sensor elements could be integrated within the membrane. This latter arrangement is characteristic of membrane bound "sensors" found in natural cells.

The function of the membrane structure surrounding the sensor will be to control the presentation of reagents to the sensor and to define the cell volume. The simplest membrane structure would exclude, (or include) materials based on size. In practical settings, this could be advantageous for preventing unwanted reagents (e.g. similar to the immunoisolating designs of Desai et al. 1998 above) from reaching, and possibly fouling, the sensor. Advanced designs can add chemical selectivity. The membrane will also be useful for containing deposited reagents, such as enzymes. Enzymes can be tethered either to the interior of the cell mimic, the sensor element or freely diffusing structures that are larger than the interfiber spacing. Techniques for controlling the interfiber spacing can be incorporated, through either physical or chemical means as described in Example 1 and 3.

Advanced versions of the membrane could incorporate specific transport mechanisms such as the enzyme-based active transport system described in Example 5. This approach could appropriately mimic natural mechanisms and can allow for an increased concentration of an analyte to be present within the cell mimic. Hence, detection sensitivity could be increased while decreasing response time.

The actuation aspects of the cell mimic structure could exploit the controlled gating of membrane pores as described in Example 5. Two basic control mechanisms are contemplated. These can be based on controlling the expansion and contraction of a polymer layer based on a change in either an electrical signal or pH. The pH sensitive polymer presents the opportunity to demonstrate a direct sensor—actuator device where changes in pH will cause direct actuation. Alternatively, a platinum-modified nanofiber electrode, placed within the cell mimic, could be used to hydrolyze water to cause a rapid, and highly localized, change in pH. The resulting actuation of the membrane would then allow for release of a reagent and diffusion back into the cell mimic, restoring the local pH. For these electrically controlled membrane actuations, the actuation signal will be derived from an appropriate sensor element.

Advanced versions can involve the release of a biochemical, possibly as a feedback mechanism. One example could involve the sensing of glucose followed by the release of a glucose metabolizing enzyme (i.e., glucose oxidase or glucokinase). Enzyme could be released until a desired concentration of glucose is present in the local microenvironment. Another example could involve the detection of glucose followed by the release of insulin. A practical device for in vivo monitoring could involve a glucose sensing element coupled to an array of drug dosing devices. Such dosing devices have been described previously for maintaining a therapeutic level of a pharmaceutical (Santini et al., 1999, above).

Example 6b

Test Stand for Evaluating Cell Mimetic Sensor—Actuators

Flow Through Test Stand—The assembled devices can be placed into a custom test stand for evaluation. The test stand can be comprised of a fluidic system, an optical monitoring system and a system for electronic measurement and control. The fluidic components of the test stand can consist of a syringe pump for controlling flow, a high performance liquid chromatography (HPLC) style fluid switching valve for introduction of various reagents into the flow stream, and the test structure with fluid inlet and outlet ports cemented onto the device. The syringe pump would allow for pulse-less flow while the HPLC style valve will allow for injection of test solutions. Similar fluidic stands have been constructed for use in the characterization of biosensors (see Subramanium et al., 2002, above). An epifluorescent optical arrangement, with CCD-based imaging and a photomultiplier can be used for monitoring fluorescence signals.

Electronics—Devices can be integrated with existing, dedicated benchtop instrumentation that includes electrochemical analyzers (CH Instruments, Model 660A), multichannel potentiostats and galvanostats (EG&G), source measure units (HP), and picoammeters (HP) and associated faraday shielding to accommodate the low level (pA) currents of the nanoscale probe devices. Data acquisition and control can be provided by Labview-based software systems with both digital and analog input/output boards.

Filling of cells—The site selective chemical techniques described in Example 3 can be used for immobilizing reagents in distinct locations. When necessary, reagent jetting techniques can be used to dispense reagents into cell structures. Such techniques are commonly used for preparing microarrays of reagents and for developing small volume fluid handling procedures (see Hicks et al., "Modification of an automated liquid handling system for reagent-jet, nano-liter-level dispensing", *Biotechniques*, 30 (4), 878-885, 2001). Both solenoid-based (available from the Lee Company) and piezo-based (available from MicroFab) jetting techniques can be used. The piezo-based devices are capable of delivering much lower volumes (down to a few picoliters), depending on the size of the orifice. Such techniques can be employed for filling the cell structures. These dispensers can be mounted onto micrometer controlled substages and video microscopy and strobe illumination can be used to assess the dispensed volumes. The video microscopy can also be used for alignment of the structures with the dispenser.

Example 6c

Complex Reaction Systems for Sensing and Actuation

As described earlier, the ultimate cellular mimic would exploit the same, solution-based sensing and actuation systems as natural cells. This approach would be the most compatible with natural systems, offer substantially more "computing" power, offer direct chemical interfacing, and operate independently, without "wires". The approach can be to mimic some naturally occurring metabolic or regulatory pathways, inserting linked chemical steps as necessary for transducing chemical signals into actuation.

Natural cells use complex metabolic (for energy processing) and regulatory (for information processing) networks that are beginning to be unraveled through efforts related to genome sequencing. Recognition of these systems for performing complex logic functions is increasing (see Hiratsuka et al., "Pattern formation in reaction-diffusion enzyme transistor circuits", *IEICE Transactions on Fundamentals of Electronics Communications and Computer Sciences*, E82 (9), 1809-1817, 1999; Hiratsuka et al., "Enzyme transistor circuits for reaction-diffusion computing.", *IEEE Trans. On cir. and Sys. —I: Fund. Theory and Appl.*, 46(2), 294-303, 1999; Simpson et al., "Whole-cell biocomputing: engineering the information processing functionality of cells," *Trends in Biotechnology*, 19(8), 317-323, 2001; Weiss and Knight, "Engineered communications for microbial robotics." *Proceedings of DNA 6: Sixth International Meeting on DNA Based Computers*, 2000; Weiss, Homsy, and Knight "Toward in vivo digital circuits.", *Proceedings of the Dimacs Workshop on Evolution as Computation*, 1999; Gardner, Cantor and Collins, "Construction of a genetic toggle switch in *Escherichia coli*", *Nature*, 403(6767), 339-342, 2000; and Elowitz and Leibler, "A synthetic oscillatory network of transcriptional regulators", *Nature*, 403(6767), 335-338, 2000). Though some individual steps of a few metabolic and regulatory networks are fairly well characterized in vitro, analogous pathways, characterized under conditions that better represent those in the cell, are nearly unexplored. The mimic structures developed in the present invention offer the opportunity to investigate these pathways under volume and concentration conditions that closely model those of natural cells.

Perhaps the best understood metabolic networks are those related to carbohydrates and energy metabolism. The glycolysis and gluconeogenesis pathways represent classic examples. The individual steps and control mechanisms have been extensively characterized. Further, the enzymes and related biochemicals are commercially available. Therefore, the glycolysis-gluconeogenesis pathways present an ideal system for studies. A critical "sensing" step in glycolysis occurs during the transformation of fructose-6-phosphate to fructose-1,6-bisphosphate. This is an important control step as formation of fructose-1,6-bisphosphate represents a commitment to glycolysis that controls the rate at which the cell uses hexose phosphates. This reaction is made energetically favorable through the coupling of ATP hydrolysis. The reverse reaction, the hydrolysis of fructose-1,6-bisphosphate to fructose-6-phosphate is also thermodynamically favorable. Therefore, no matter what the concentration ratio of fructose-6-phosphate to fructose-1,6-bisphosphate, both reactions are energetically favorable and far from equilibrium. Hence, the conversion between these two compounds is placed under kinetic control, depending on the needs of the cell (see Zubay, "Biochemistry," Macmillan Publishing Company, New York, 1988). This metabolic control step can be exploited for artificial uses of sensing and control.

One of the chemical controllers of this step is the concentration of adenosine triphosphate. The formation of fructose-1,6-bisphosphate is catalyzed by the allosteric enzyme phosphofructokinase (PFK), which is regulated by the concentration of ATP. Sufficient amounts of ATP in the cell inhibit the PFK catalyzed reaction. Binding of ATP to a regulatory site on the enzyme lowers the affinity between PFK and fructose-6-phosphate, preventing further metabolism for energy production. In addition, PFK is also regulated by its product, fructose-1,6-bisphosphate (activation of PFK), as well as ADP concentration (activation of PFK). These feedback mechanisms, along with allosteric control of enzymes, represent the biochemical "logic" used by the cell to regulate metabolism. Such an enzymatic step can be studied alone, or in combination with other enzymes. For example, PFK can be coupled to other enzymatically catalyzed steps for connecting chemical sensing to actuation. In one specific example, actuation could be accomplished in the form of light emission from luciferase and appropriate substrates. Clearly, even "simple" metabolic networks present a complicated chemical conversion pathway. Coupling a network as elaborated by Hervagault et al. (see "Multiple steady states and oscillatory behavior of a compartmentalized phosphofructokinase system", Proc. Natl. Acad. Sci. USA, 80, 5455-5459, 1983) to light emission offers an "actuation" method as well as a means for interpreting ATP levels. The effects of reaction and diffusion rates can also be evaluated.

Thus, there has been provided a nanoengineered membrane for controlling material transport (e.g., molecular transport). The membrane includes a substrate and a cover. The substrate and the cover at least partially define a channel between the substrate and the cover. The membrane also includes a plurality of fibers connected to and extending away from a surface of the substrate. The fibers are positioned in the channel and are aligned within 45 degrees of perpendicular to the surface of the substrate. The fibers have a width of 100 nanometers or less. The diffusion limits for material transport are controlled by the separation of the fibers. In one form, a coating may be applied to the fibers to further affect the diffusion limits or affect selective permeability or facilitated transport. In another form, individually addressable carbon nanofibers can be integrated with the membrane to provide an electrical driving force for material transport. In other forms of the membrane, the carbon nanofiber posts could be constructed out of alternate materials, such as silicon, metal, or plastic. The membrane can also be combined with sensing capabilities for feedback control.

Molecular separation based on molecular properties such as size, charge, or affinity is possible using the molecularly scaled membrane. Molecular transport that is not limited to fluidic transport can also be accomplished. Nanometer scale control of membrane structure and properties can be used to define molecular transport through the membrane. Uses include the analytical separation of molecular components.

Although the present invention has been described in considerable detail with reference to certain embodiments, one skilled in the art will appreciate that the present invention can be practiced by other than the described embodiments, which have been presented for purposes of illustration and not of limitation. Therefore, the scope of the appended claims should not be limited to the description of the embodiments contained herein.

What is claimed is:

1. A membrane for controlling material transport, the membrane comprising:
   a membrane enclosure comprising a substrate and a cover and an outer wall, the substrate and the cover at least partially defining a channel between the substrate and the cover; and
   a plurality of fibers randomly placed on a surface of the substrate, the fibers connected to and extending away from the surface of the substrate, the fibers being positioned in the channel, the fibers being aligned to each other and the fibers extending away from the surface of the substrate within 45 degrees of perpendicular to the surface of the substrate, and the fibers having a width of 100 nanometers or less,
   wherein at least a portion of the fibers have a coating, the coating having a thickness creating interfiber spacing, and
   wherein the outer wall of the membrane enclosure comprises at least a portion of the fibers, and
   wherein at least a portion of the fibers contact the cover.

2. The membrane of claim 1 wherein the substrate and the cover completely define the channel.

3. The membrane of claim 1 further comprising a layer of material disposed between the substrate and the cover, wherein the substrate, the layer and the cover completely define the channel.

4. The membrane of claim 1 wherein the fibers are carbon fibers.

5. The membrane of claim 1 wherein the fibers are formed from a material selected from the group consisting of ceramics, metals and polymeric materials.

6. The membrane of claim 1 wherein at least a portion of the fibers have diameters in the range of 1 to 100 nanometers.

7. The membrane of claim 1 wherein at least a portion of the fibers have a length greater than 10 nanometers.

8. The membrane of claim 1 wherein at least a portion of the fibers have an interfiber spacing of 1-500 nanometers.

9. The membrane of claim 1 wherein the coating comprises a coating selected from the group consisting of oxides, metals and polymeric materials.

10. The membrane of claim 1 wherein the coating is adsorbed on the fibers.

11. The membrane of claim 1 wherein the coating comprises a biomolecule.

12. The membrane of claim 1 wherein the coating is covalently linked to the surface of the fibers.

13. The membrane of claim 1 wherein the coating is formed from a coupling agent and a primary amine.

14. The membrane of claim 13 wherein the coupling agent is a carbodiimide and the primary amine is an amine-containing protein.

15. The membrane of claim 1 wherein the coating comprises an electro-generated polymeric coating.

16. The membrane of claim 15 wherein the electro-generated polymeric coating comprises a conducting polymer selected from the group consisting of polypyrroles, polyanilines, polyacetylenes, polyindoles and polythiophenes.

17. The membrane of claim 15 wherein the thickness of the electro-generated polymeric coating is different on at least two fibers having the electro-generated polymeric coating.

18. The membrane of claim 15 wherein a biomolecule is entrapped in or covalently coupled to the electro-generated polymeric coating.

19. The membrane of claim 1 wherein at least a portion of the fibers have at least a second coating different from the first coating.

20. The membrane of claim 1 wherein the coating changes volume upon application of an electrical potential.

21. The membrane of claim 20 wherein the coating comprises an electro-generated polymeric coating having incorporated anions.

22. The membrane of claim 1 wherein the coating changes volume upon sensing a change in pH.

23. The membrane of claim 22 wherein the coating comprises an acrylic polymer.

24. The membrane of claim 1 wherein the plurality of fibers are separated into greater than two regions of fibers, a first region of fibers having fibers with a first coating, a second region of fibers having fibers with a second coating, and a third region of fibers separating the first region of fibers and the second region of fibers, the fibers in the third region being uncoated.

25. The membrane of claim 24 wherein the first coating catalyzes a phosphorylation reaction and the second coating catalyzes a dephosphorylation reaction.

26. The membrane of claim 1 wherein the membrane is responsive to a signal and a region of fibers has fibers with a coating that changes volume upon application of the signal.

27. The membrane of claim 26 wherein the signal is chemical, electrical or optical.

28. The membrane of claim 1 wherein the plurality of fibers are separated into a first region of fibers and a second region of fibers, the first region of fibers and the second region of fibers being in signal communication, the first region of fibers having fibers with a first coating suitable for generating a signal upon detecting an analyte, and the second region of fibers having fibers with a second coating that changes volume upon application of the signal.

29. The membrane of claim 28 wherein the signal is chemical, electrical or optical.

30. The membrane of claim 28 wherein the second region of fibers is formed in a structure that contains a chemical and the change in volume of the second coating releases the chemical from the structure.

31. The membrane of claim 1 wherein the plurality of fibers includes a first group of fibers and a second group of fibers, the first group of fibers and the second group of fibers being formed in a structure that contains a chemical, the first group of fibers and the second group of fibers being in signal communication, the first group of fibers having a first coating suitable for generating a signal upon detecting an analyte, and the second group of fibers having a second coating that changes volume upon application of the signal, wherein the change in volume of the second coating releases the chemical from the structure.

32. The membrane of claim 31 wherein the signal is chemical, electrical or optical.

33. The membrane of claim 1 wherein the plurality of fibers includes a group of fibers formed in a structure that contains a chemical, the group of fibers having a coating that changes volume upon sensing a change in pH, wherein the change in volume of the coating releases the chemical from the structure.

34. A structure for controlling transport of a material, the structure comprising:
a membrane enclosure having at least one outer wall, at least a portion of one outer wall comprising a plurality of spaced apart fibers having a fiber width of 250 nanometers or less; and
a material located within the membrane enclosure, the material having a physical or chemical property such that the material is selectively restricted by the fibers from passing from the inside to the outside of the enclosure; and
means for controlling transport of the material both into and out of the membrane enclosure.

35. The structure of claim 34 wherein the membrane enclosure comprises the plurality of fibers, a substrate, and a cover, the plurality of fibers being connected to and extending away from a surface of the substrate, the fibers being aligned within 45 degrees of perpendicular to the surface of the substrate.

36. The structure of claim 35 wherein at least one of the substrate and cover is porous.

37. The structure of claim 34 further comprising means for altering cross-sectional area or spacing of the fibers such that the material may pass from the one side to the opposite side of the fibers.

38. The structure of claim 37 wherein the means for altering cross-sectional area or spacing of the fibers comprises a coating on the fibers, the coating changing volume upon application of a signal to the coating.

39. The structure of claim 34 further comprising a second membrane enclosure having at least one wall, at least a portion of one wall comprising the plurality of spaced apart fibers.

40. The structure of claim 39 further comprising means for altering cross-sectional area or spacing of the fibers such that the material may pass from the membrane enclosure to the second membrane enclosure.

41. The structure of claim 40 wherein the means for altering cross-sectional area or spacing of the fibers comprises a coating on the fibers, the coating changing volume upon application of a signal to the coating.

42. The structure of claim 39 further comprising a second material located within the second membrane enclosure, the second material having a chemical or physical property such that the material is restricted from passing from one side to an opposite side of the fibers.

43. The structure of claim 42 further comprising means for altering cross-sectional area or spacing of the fibers such that the second material may pass from the second membrane enclosure to the membrane enclosure.

44. The structure of claim 43 wherein the means for altering cross-sectional area or spacing of the fibers comprises a coating on the second plurality of spaced apart fibers, the coating changing volume upon application of a signal to the coating.

45. A membrane for controlling material transport, the membrane comprising:
a membrane enclosure comprising a substrate and a cover and an outer wall;
the cover defining a channel between the substrate and the cover; and
a plurality of fibers connected to and extending away from a surface of the substrate, the fibers being positioned in the channel, the fibers being aligned within 45 degrees of perpendicular to the surface of the substrate, and the fibers having a width of 100 nanometers or less, and
means for controlling transport of a molecule both into and out of the membrane enclosure,
wherein at least two of the fibers are bonded to separate conductive leads,
wherein the outer wall of the membrane enclosure comprises at least a portion of the fibers, and
wherein the separate conductive leads are in electrical communication with a source of electricity.

46. The membrane of claim 45 wherein the source of electricity is used to create an electrical gradient between fibers.

47. The membrane of claim 46 wherein at least a portion of the fibers have a coating comprising an oxide, and at least a portion of the fibers are uncoated thereby creating an electrochemically active region on the uncoated portion of the fibers.

48. A membrane for controlling material transport, the membrane comprising:
- a membrane enclosure comprising a substrate and a cover and an outer wall, the substrate and the cover at least partially defining a channel between the substrate and the cover; and
- a plurality of fibers connected to and extending away from a surface of the substrate, the fibers being positioned in the channel, the fibers being aligned within 45 degrees of perpendicular to the surface of the substrate, and the fibers having a width of 100 nanometers or less, and
- means for controlling transport of a molecule both into and out of the membrane enclosure,
- wherein at least a first group of the fibers have a first coating,
- wherein the outer wall of the membrane enclosure comprises at least a portion of the fibers, and
- wherein at least a second group of the fibers have at least a second coating different from the first coating, wherein the difference in the first coating and the second coating alters material transport through the membrane.

49. A membrane for controlling material transport, the membrane comprising:
- a membrane enclosure comprising a substrate and a cover and an outer wall, the substrate and the cover at least partially defining a channel between the substrate and the cover; and
- a plurality of fibers connected to and extending away from a surface of the substrate, the fibers being positioned in the channel, the fibers being aligned within 45 degrees of perpendicular to the surface of the substrate, the fibers being aligned to each other, and the fibers having a width of 100 nanometers or less, and
- means for controlling transport of a material both into and out of the membrane enclosure;
- wherein at least a portion of the fibers have a coating,
- wherein the outer wall of the membrane enclosure comprises at least a portion of the fibers, and
- wherein the means for controlling transport comprises a region of fibers having a coating that changes volume upon application of a signal, and
- wherein at least a portion of the fibers contact the cover.

50. The membrane of claim 49 wherein the signal is chemical, electrical or optical.

51. A membrane for controlling material transport, the membrane comprising:
- a substrate and a cover, the substrate and the cover at least partially defining a channel between the substrate and the cover; and
- a plurality of fibers connected to and extending away from a surface of the substrate, the fibers being positioned in the channel, the fibers being aligned within 45 degrees of perpendicular to the surface of the substrate, and the fibers having a width of 100 nanometers or less,
- wherein the plurality of fibers are separated into greater than two regions of fibers, a first region of fibers having fibers with a first coating, a second region of fibers having fibers with a second coating, and a third region of fibers separating the first region of fibers and the second region of fibers, the fibers in the third region being uncoated.

* * * * *

UNITED STATES PATENT AND TRADEMARK OFFICE
CERTIFICATE OF CORRECTION

PATENT NO. : 7,641,863 B2
APPLICATION NO. : 10/383309
DATED : January 5, 2010
INVENTOR(S) : Doktycz et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1053 days.

Signed and Sealed this

Twenty-first Day of December, 2010

David J. Kappos
*Director of the United States Patent and Trademark Office*